(12) United States Patent
Shirai et al.

(10) Patent No.: US 6,747,733 B2
(45) Date of Patent: Jun. 8, 2004

(54) ELECTRONIC DISTANCE METER

(75) Inventors: Masami Shirai, Saitama (JP); Shinichi Suzuki, Saitama (JP); Homu Takayama, Saitama (JP); Masayuki Ueno, Saitama (JP)

(73) Assignees: PENTAX Corporation, Tokyo (JP); PENTAX Precision Co., Ltd., Tokyo (JP)

( * ) Notice: Subject to any disclaimer, the term of this patent is extended or adjusted under 35 U.S.C. 154(b) by 0 days.

(21) Appl. No.: 10/282,126

(22) Filed: Oct. 29, 2002

(65) Prior Publication Data

US 2003/0107721 A1 Jun. 12, 2003

(30) Foreign Application Priority Data

Oct. 30, 2001 (JP) ........................................ 2001-332060

(51) Int. Cl.[7] ................................................. G01C 3/08
(52) U.S. Cl. ....................... 356/5.1; 356/4.01; 356/5.01
(58) Field of Search .............................. 356/4.01–5.15, 356/496, 498, 521

(56) References Cited

U.S. PATENT DOCUMENTS

| | | | | | |
|---|---|---|---|---|---|
| 4,042,822 | A | * | 8/1977 | Brandewie et al. | ......... 250/216 |
| 5,061,062 | A | * | 10/1991 | Schneiter | ................... 356/3.05 |
| 5,200,606 | A | * | 4/1993 | Krasutsky et al. | ......... 250/216 |
| 5,638,220 | A | | 6/1997 | Ohtomo et al. | |
| 5,774,208 | A | | 6/1998 | Abe | |
| 5,796,517 | A | | 8/1998 | Sensui et al. | |
| 5,870,637 | A | | 2/1999 | Sensui | |
| 5,923,468 | A | | 7/1999 | Tsuda et al. | |
| 6,072,642 | A | | 6/2000 | Shirai | |
| 6,115,114 | A | * | 9/2000 | Berg et al. | .................. 356/5.13 |
| 6,324,024 | B1 | | 11/2001 | Shirai et al. | |
| 6,344,639 | B1 | | 2/2002 | Shirai | |
| 6,350,975 | B1 | | 2/2002 | Shirai | |
| 6,354,010 | B1 | | 3/2002 | Shirai | |

FOREIGN PATENT DOCUMENTS

| JP | 4-319687 | 11/1992 |
|---|---|---|
| JP | 5-272967 | 10/1993 |
| JP | 7-239448 | 9/1995 |

* cited by examiner

Primary Examiner—Thomas H. Tarcza
Assistant Examiner—Brian Andrea
(74) Attorney, Agent, or Firm—Greenblum & Bernstein, P.L.C.

(57) ABSTRACT

An electronic distance meter includes a sighting telescope optical system having an objective lens for sighting an object, and an optical distance meter which includes a light-transmitting optical system for transmitting a measuring light toward the object via the objective lens, and a light-receiving optical system for receiving a portion of the measuring light which is reflected by the object. The light-transmitting optical system includes a light-shield mask having a translucent portion to define a beam profile of the measuring light. The translucent portion comprises a filter having an uneven density, light transmittance of a central portion of the filter being greater than light transmittance of a peripheral portion of the filter.

55 Claims, 14 Drawing Sheets

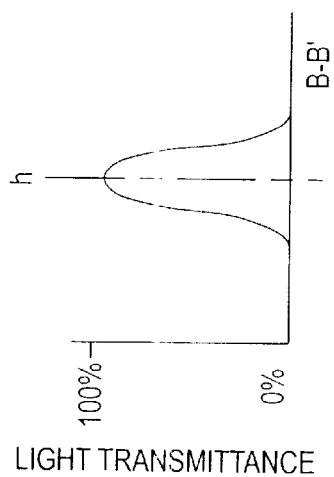
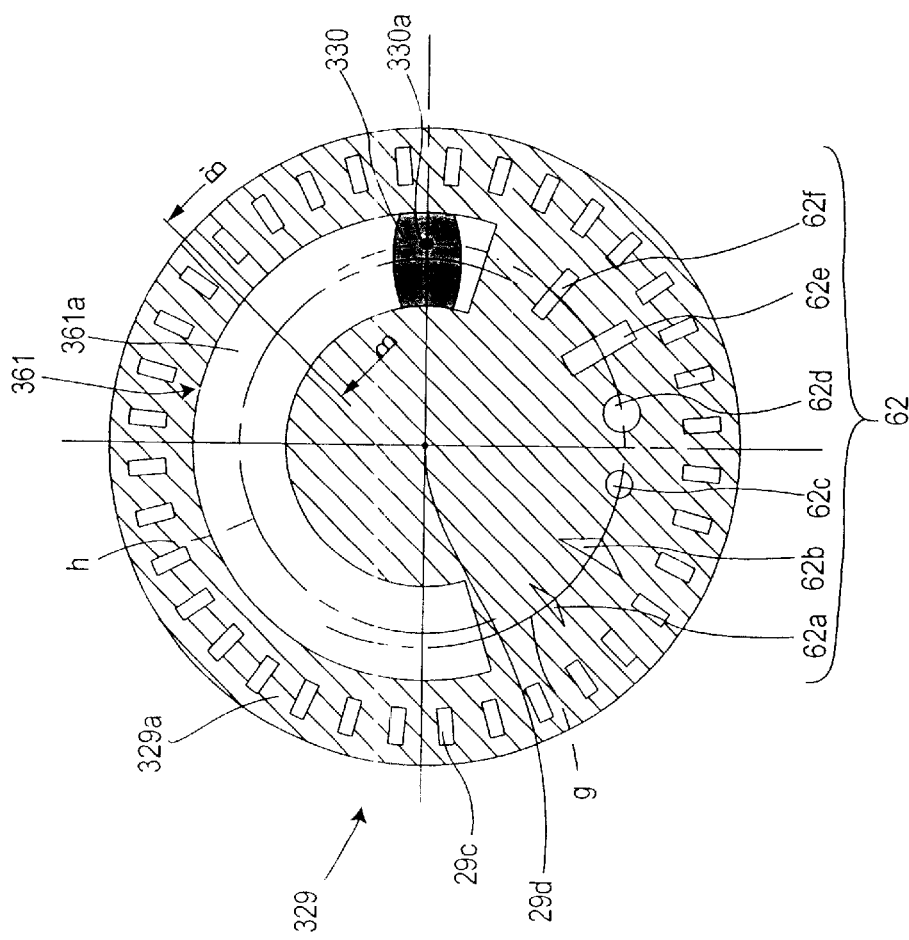
Fig. 16B
Fig. 16A

ELECTRONIC DISTANCE METER

BACKGROUND OF THE INVENTION

1. Field of the Invention

The present invention relates to an electronic distance meter having a sighting telescope.

2. Description of the Related Art

When a surveyor measures the distance between two points, an electronic distance meter (EDM) is generally used. An electronic distance meter calculates the distance via the phase difference between a projecting light and a reflected light and via the initial phase of an internal reference light, or via the time difference between the projecting light and the reflected light.

A typical electronic distance meter is provided, behind the objective lens of a sighting telescope thereof, with a light transmitting/receiving mirror positioned on the optical axis of the sighting telescope, a light emitting element which emits a measuring light to transmit the same toward a target via the light transmitting/receiving mirror, and a light receiving element which receives the light that is reflected by the target and not interrupted by the light transmitting/receiving mirror.

In such an electronic distance meter, the light which is reflected by the target and passed through the objective lens of the sighting telescope is interrupted by the light transmitting/receiving mirror. Various proposals to prevent this problem from occurring have been known in the art. For instance, the following first and second proposals are known in the art. The first proposal is to make the measuring light have an asymmetrical beam profile with respect to a point, while the second proposal is to transmit the measuring light toward a target along an optical path which is displaced slightly from the optical axis of the sighting telescope.

However, according to the first proposal, if the measuring light has an asymmetrical beam profile with respect to a point by a light-shield mask disposed in an optical path between the light emitting element and the light transmitting/receiving mirror, light rays of the measuring light which are passed through the light-shield mask interfere with each other to produce diffraction fringes at a measuring point. At this time, reflections of the produced diffraction fringes become noise depending on the distance to the point of measurement or terms and conditions of the measuring point, deteriorating the accuracy of distance-measurement. On the other hand, in an electronic distance meter using the measuring light as a pointer for collimation, due to the measuring light having an asymmetrical beam profile with respect to a point, it is difficult to visually perceive the center of the measuring light spot on the target.

According to the second proposal, it is difficult to use the measuring light toward the target as a pointer for collimation since a central ray of the measuring light is displaced from the optical axis of the sighting telescope.

SUMMARY OF THE INVENTION

The present invention has been devised in view of the problems noted above, and accordingly, the present invention provides an electronic distance meter which makes it possible to measure distances with a high degree of precision without being influenced by terms and conditions of the measuring point. The present invention also provides an electronic distance meter in which it is easy to visually perceive the center of the measuring light spot on the target when the measuring light is used as a pointer for collimation.

For example, an electronic distance meter is provided, including a sighting telescope optical system having an objective lens for sighting an object, and an optical distance meter which includes a light-transmitting optical system for transmitting a measuring light toward the object via the objective lens, and a light-receiving optical system for receiving a portion of the measuring light which is reflected by the object. The light-transmitting optical system includes a light-shield mask having a translucent portion to define a beam profile of the measuring light. The translucent portion includes a filter having an uneven density, light transmittance of a central portion of the filter being greater than light transmittance of a peripheral portion of the filter.

It is desirable for the filter to be a neutral density filter.

It is also desirable for the light transmittance of the filter to have a Gaussian distribution.

The translucent portion can be in the shape of a rectangle, a triangle, a circle or an ellipse.

The electronic distance meter can further include a diffraction mask having at least one diffraction aperture which causes diffraction fringes on the measuring light passed therethrough, and a mode selecting device for switching between a pointer mode in which the diffraction mask is inserted into a distance-measuring optical path and a distance measuring mode in which the diffraction mask is retracted from the distance-measuring optical path.

The diffraction aperture can be in the shape of a rectangle, a triangle, a circle or an ellipse.

The light-transmitting optical system can include a second neutral density filter for adjusting the amount of the measuring light which is transmitted toward the object.

The second neutral density filter can include a rotary disk having a rotational axis extending parallel to said distance-measuring optical path, wherein the rotary disk is provided with the diffraction aperture and an arc-shaped ND filter portion. Both of the diffraction aperture and the arc-shaped ND filter portion are positioned on and along a circle having a predetermined radius about the rotational axis. The light transmittance of the arc-shaped ND filter portion continuously varies in a circumferential direction thereof. A central ray of the measuring light intersects the circle and incidents upon the center of the diffraction aperture or the centerline of the arc-shaped ND filter portion in accordance with rotational position of the rotary disk.

It is desirable for the electronic distance meter to include a mask driver which rotates the rotary disk to insert the arc-shaped ND filter portion into the distance-measuring optical path when in the distance measuring mode, and to inserts the diffraction aperture into the distance-measuring optical path when in the pointer mode.

The diffraction aperture can include a plurality of diffraction apertures having different shapes, and wherein the mask driver selects a diffraction aperture from among the plurality of diffraction apertures and inserts the selected diffraction aperture into the distance-measuring optical path in the pointer mode.

It is desirable for the electronic distance meter to include a controller which actuates the mask driver in accordance with an object distance.

It is desirable for the electronic distance meter to include a focus detecting device for detecting a focus state of the sighting telescope optical system, wherein the controller actuates the mask driver in accordance with the focus state detected by the focus detecting device.

The translucent portion can be in the shape of a cross or a star.

It is desirable for the light transmittance of the filter to decrease in radial directions from an approximate center of the translucent portion toward an edge thereof.

It is desirable for the optical distance meter to include a light source which emits the measuring light to travel in a distance-measuring optical path therealong.

The rotary disk can include a plurality of slits at equiangular intervals about the rotational axis, the plurality of slits being used to sense a rotational position of the rotary disk.

According to another embodiment, an electronic distance meter is provided, including a sighting telescope optical system having an objective lens for sighting an object, an optical distance meter including a light-transmitting optical system for transmitting a measuring light toward the object on an optical axis of the objective lens there along, and a diffraction mask having at least one diffraction aperture which causes the measuring light to produce diffraction fringes.

The diffraction aperture can be in the shape of a rectangle, a triangle, a circle or an ellipse.

It is desirable for the diffraction aperture to include a plurality of diffraction apertures having different shapes, the electronic distance meter including a mask driver which selects a diffraction aperture from among the plurality of diffraction apertures and inserts the selected diffraction aperture into a distance-measuring optical path.

It is desirable for the electronic distance meter to include a controller which actuates the mask driver in accordance with an object distance.

It is desirable for the electronic distance meter to further include a focus detecting device for detecting a focus state of the sighting telescope optical system, wherein the controller actuates the mask driver in accordance with the focus state detected by the focus detecting device.

It is desirable for the optical distance meter to include a light source which emits the measuring light to travel in a distance-measuring optical path therealong.

According to another embodiment, an electronic distance meter is provided, including a sighting telescope optical system having an objective lens for sighting an object; an optical distance meter which includes a light-transmitting optical system for transmitting a measuring light toward the object via the objective lens, and a light-receiving optical system for receiving a portion of the measuring light which is reflected by the object; a mode selecting device for switching between a distance measuring mode and a pointer mode; and a rotary disk positioned in the light-transmitting optical system, the rotary disk having a rotational axis extending parallel to an distance-measuring optical path. The rotary disk is provided with a diffraction mask and a light-shield mask at different radius positions from the rotational axis of the rotary disk. The diffraction mask has at least one diffraction aperture for causing diffraction fringes on the measuring light passed therethrough. The light-shield mask includes at least one translucent portion for defining a beam profile of the measuring light. The translucent portion comprises a filter having an uneven density, light transmittance of a central portion of the filter being greater than light transmittance of a peripheral portion of the filter. The rotary disk is rotated to insert the diffraction aperture into the distance-measuring optical path when in the pointer mode, and to insert the translucent portion into the distance-measuring optical path when in the distance measuring mode. A locus of the center of the diffraction aperture upon rotating the rotary disk intersects the distance-measuring optical path while a locus of the center of the translucent portion upon rotating the rotary disk is deviated from the distance-measuring optical path.

It is desirable for the filter to be a neutral density filter.

It is desirable for the light transmittance of the filter to have a Gaussian distribution.

The translucent portion can be in the shape of a rectangle, a triangle, a circle or an ellipse.

The diffraction aperture can be in the shape of a rectangle, a triangle, a circle or an ellipse.

The translucent portion can include a plurality of translucent portions having the same shape and different light transmittances, the electronic distance meter including a mask driver which selects a translucent portion from among the plurality of translucent portions and inserts the selected translucent portion into the distance-measuring optical path when the distance measuring mode is selected with the mode selecting device.

It is desirable for the diffraction aperture to include a plurality of diffraction apertures having different shapes, the electronic distance meter including a mask driver which selects a diffraction aperture from among the plurality of diffraction apertures and inserts the selected diffraction aperture into the distance-measuring optical path when the pointer mode is selected with the mode selecting device.

It is desirable for the electronic distance meter to include a controller which actuates the mask driver in accordance with an object distance.

It is desirable for the electronic distance meter to include a focus detecting device for detecting a focus state of the sighting telescope optical system, wherein the controller actuates the mask driver in accordance with the focus state detected by the focus detecting device.

It is desirable for the light transmittance of the filter to decrease in radial directions from a center of the filter toward an edge thereof.

It is desirable for the optical distance meter to include a light source which emits the measuring light to travel in the distance-measuring optical path therealong.

The rotary disk can include a plurality of slits at equiangular intervals about the rotational axis of the rotary disk, the plurality of slits being used to sense a rotational position of the rotary disk.

According to another embodiment, an electronic distance meter is provided, including a sighting telescope optical system having an objective lens for sighting an object; an optical distance meter including a light-transmitting optical system for transmitting a measuring light toward the object via the objective lens, and a light-receiving optical system for receiving a portion of the measuring light which is reflected by the object; a mode selecting device for switching between a distance measuring mode and a pointer mode; and a rotary disk positioned in the light-transmitting optical system and having a rotational axis extending parallel to an distance-measuring optical path. The rotary disk is provided with a diffraction mask and a light-shield mask at same radius positions from the rotational axis of the rotary disk, the diffraction mask having at least one diffraction aperture for causing diffraction fringes on the measuring light passed therethrough, and the light-shield mask having at least one translucent portion for defining a beam profile of the measuring light. A central ray of the measuring light incidents upon the center of the diffraction aperture or the center of the translucent portion in accordance with rotational position of the rotary disk. The translucent portion comprises a filter having an uneven density, light transmittance of a central portion of the filter being greater than light transmittance of a peripheral portion of the filter. The electronic distance meter includes a mask driver which rotates the rotary disk to insert the translucent portion into the distance-measuring optical path when in the distance measuring mode, and to insert the diffraction aperture into the distance-measuring optical path when in the pointer mode; and a controller which actuates the mask driver to rotate the rotary disk so that the center of the translucent portion deviates from the central ray of the measuring light if a measuring light which is reflected by the object is not received enough by the light-receiving optical system when in the distance measuring mode.

It is desirable for the filter to be a neutral density filter.

It is also desirable for the light transmittance of the filter to have a Gaussian distribution.

The translucent portion can be in the shape of a rectangle, a triangle, a circle or an ellipse.

The diffraction aperture can be in the shape of a rectangle, a triangle, a circle or an ellipse.

The translucent portion can include a plurality of translucent portions having the same shape and different light transmittances, wherein the mask driver selects a translucent portion from among the plurality of translucent portions and inserts the selected translucent portion into the distance-measuring optical path when the distance measuring mode is selected with the mode selecting device.

The diffraction aperture can include a plurality of diffraction apertures having different shapes, wherein the mask driver selects a diffraction aperture from among the plurality of diffraction apertures and inserts the selected diffraction aperture into the distance-measuring optical path when the pointer mode is selected with the mode selecting device.

The controller can actuate the mask driver in accordance with an object distance.

It is desirable for the electronic distance meter to include a focus detecting device for detecting a focus state of the sighting telescope optical system, wherein the controller actuates the mask driver in accordance with the focus state detected by the focus detecting device.

It is desirable for the light transmittance of the filter to decreases in radial directions from a center of the filter toward an edge thereof.

It is desirable for the optical distance meter to include a light source which emits the measuring light to travel in the distance-measuring optical path therealong.

The rotary disk can include a plurality of slits at equi-angular intervals about the rotational axis of the rotary disk, the plurality of slits being used to sense a rotational position of the rotary disk.

According to another embodiment, an electronic distance meter is provided, including a sighting telescope optical system having an objective lens for sighting an object; an optical distance meter which includes a light-transmitting optical system for transmitting a measuring light toward the object via the objective lens, and a light-receiving optical system for receiving a portion of the measuring light which is reflected by the object, the measuring light having an elliptical beam profile; a mode selecting device for switching between a distance-measuring mode and a pointer mode; and a rotary disk positioned in the light-transmitting optical system and having a rotational axis extending parallel to an optical axis of the measuring light. The rotary disk is provided with a diffraction mask and a light-shield mask at different radius positions from the rotational axis of the rotary disk. The diffraction mask having at least one diffraction aperture for causing diffraction fringes on the measuring light passed therethrough, and the light-shield mask having an arc-shaped translucent portion which intercepts opposite ends of the elliptical beam profile of the measuring light in a direction of a major axis of said elliptical beam profile. The arc-shaped translucent portion comprises a filter having an uneven density, light transmittance of the filter decreases in radical directions from an approximate center of the filter toward opposite edges thereof, light transmittance of the filter also varying in a circumferential direction of the rotary disk. The rotary disk is rotated to insert the diffraction aperture into the distance-measuring optical path when in the pointer mode, and to insert the arc-shaped translucent portion into the distance-measuring optical path when in the distance measuring mode. A locus of the center of the diffraction aperture upon rotating the rotary disk intersects the distance-measuring optical path, while a locus of the center of the translucent portion upon rotating the rotary disk is deviated from the distance-measuring optical path.

It is desirable for the filter to be a neutral density filter.

The diffraction aperture can be in the shape of a rectangle, a triangle, a circle or an ellipse.

It is desirable for the optical distance meter to include a light source which emits the measuring light to travel in the distance-measuring optical path therealong.

The rotary disk can include a plurality of slits at equi-angular intervals about the rotational axis of the rotary disk.

The present disclosure relates to subject matter contained in Japanese Patent Application No. 2001-332060 (filed on Oct. 30, 2001) which is expressly incorporated herein by reference in its entirety.

BRIEF DESCRIPTION OF THE DRAWINGS

The present invention will be described below in detail with reference to the accompanying drawings in which:

FIG. 16A is a plan view of a ND filter used in the forth embodiment of the electronic distance meter; and FIG. 16B is a graph showing a distribution of light transmittance of an arc-shaped translucent portion formed on the ND filter shown in FIG. 16A.

DESCRIPTION OF THE PREFERRED EMBODIMENTS

FIGS. 1 through 7 show the first embodiment of an electronic distance meter (EDM) equipped with an autofocus system, according to the present invention. The electronic distance meter designed as a surveying instrument is provided with a sighting telescope 10 and an optical distance meter 20.

Figure 1:
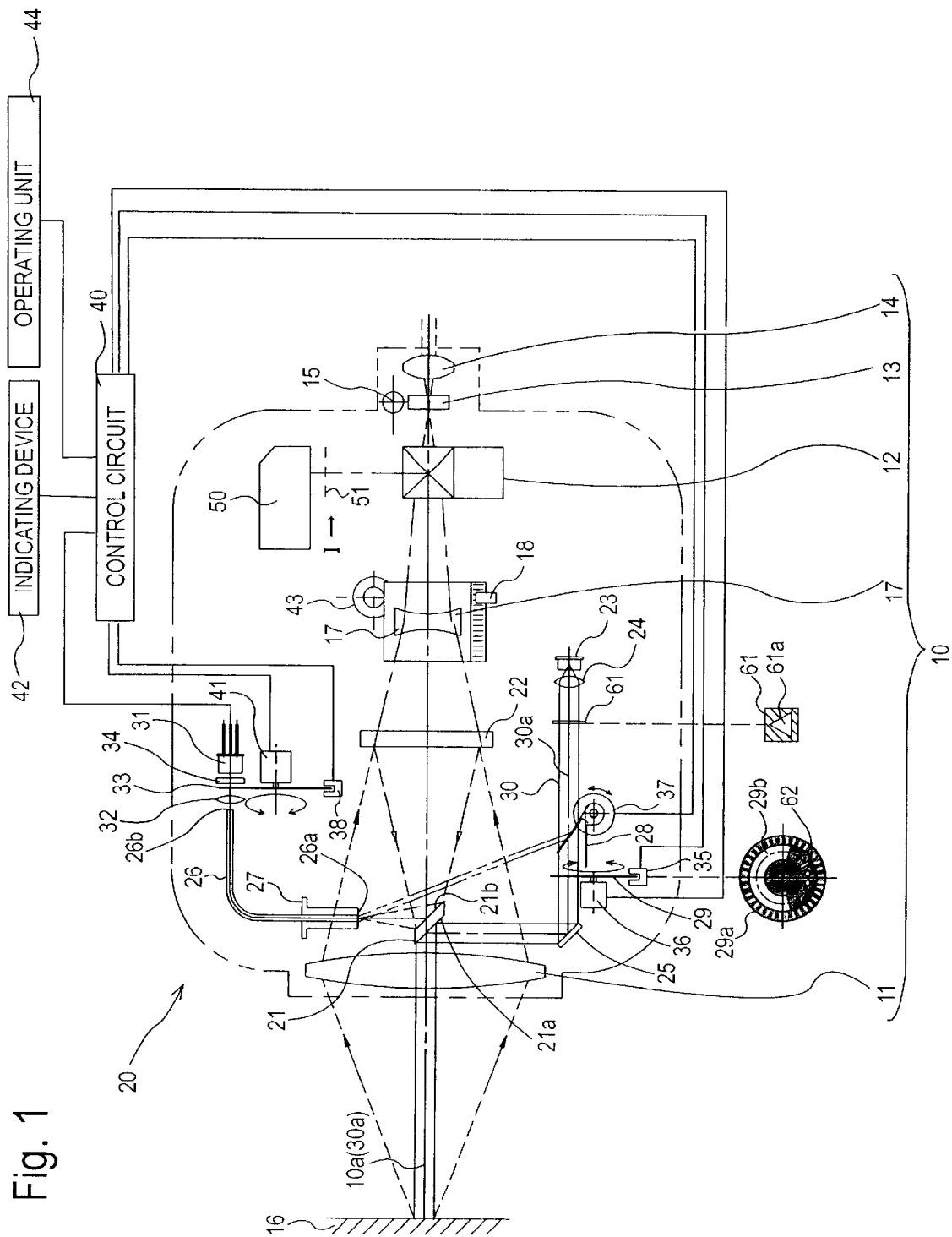
FIG. 1 is a schematic diagram of a first embodiment of an electronic distance meter equipped with an autofocus system, according to the present invention.

As shown in FIG. 1, the sighting telescope 10 is provided with an objective lens 11, a focusing lens (focus adjustment lens) 17, a Porro-prism erecting system 12, a focal-plane plate (reticle plate) 13, and an eyepiece lens 14, in that order from the object side (i.e., left to right as shown in FIG. 1). The focal-plane plate 13 is provided thereon with a reticle (cross hair) 15. The focusing lens 17 is guided in a direction of an optical axis of the sighting telescope 10. The image of a sighting object 16 that is formed through the objective lens 11 can be precisely focused on the front surface (the surface facing the objective lens 11) of the focal-plane plate 13 by adjusting the axial position of the focusing lens 17 in accordance with the distance of the sighting object 16 with respect to the sighting telescope 10. The user (surveyor) of the surveying instrument sights a magnified image of the sighting object 16, which is focused on the focal-plane plate 13, via the eyepiece 14.

The optical distance meter 20 is provided, behind the objective lens 11 of the sighting telescope 10, with a light transmitting/receiving mirror (reflection member) 21 and a wavelength selection mirror (wavelength selection filter) 22, which are arranged in that order from the object side. The light transmitting/receiving mirror 21 is made of a parallel-plate mirror having front and rear parallel surfaces positioned on the optical axis of the objective lens 11, which is coincident with an optical axis (collimation axis) 10a of the sighting telescope 10 from the light transmitting/receiving mirror 21 to the object. The front surface of the transmitting/receiving mirror 21 on the objective lens 11 side is formed as a light transmitting mirror 21a, while the rear surface of the transmitting/receiving mirror 21 on the wavelength selection mirror 22 side is formed as a light receiving mirror 21b. The light transmitting/receiving mirror 21 is formed so that each of the light receiving mirror 21b and the light transmitting mirror 21a is in the shape of a triangle corresponding to a triangular translucent portion 61a of a light-shield mask 61 (see FIG. 3A). The light receiving mirror 21b and the wavelength selection mirror 22 are fundamental optical elements of a light-receiving optical system of the optical distance meter 20.

The optical distance meter 20 is provided with a light emitting element (laser diode) 23 which emits light (measuring light) 30 having a specific wavelength. The measuring light 30 emitted from the light emitting element 23 is incident on the light transmitting mirror 21a via a collimating lens 24 and a fixed mirror 25. In the first embodiment of the electronic distance meter shown in FIG. 1, a central ray 30a of the measuring light 30 and the collimation axis 10a of the sighting telescope 10 are coincident with each other from the light transmitting mirror 21a to the sighting object 16, so that the measuring light 30 incident on the light transmitting mirror 21a is reflected by the light transmitting mirror 21a to proceed toward the sighting object 16 on the collimation axis 10a therealong. The collimating lens 24, the fixed mirror 25 and the light transmitting mirror 21a are fundamental optical elements of a light-transmitting optical system of the optical distance meter 20.

The portion of the measuring light 30 which is reflected by the sighting object 16, subsequently passed through the objective lens 11, and which is not interrupted by the light transmitting/receiving mirror 21 is eventually reflected back to the light receiving mirror 21b by the wavelength selection mirror 22. Thereafter, the light receiving mirror 21b reflects the incident measuring light so as to make the measuring light enter at an incident end surface 26a of a light-receiving optical fiber bundle 26. A fiber holder 27 supports the incident end of the light-receiving optical fiber bundle 26. The fiber holder 27 is immovably supported together with the light transmitting/receiving mirror 21 by a fixing device (not shown) provided in a space behind the objective lens 11.

The electronic distance meter is provided, on a distance-measuring optical path between the light emitting element 23 and the fixed mirror 25, with the collimating lens 24, the light-shield mask 61, a switching mirror 28, and a ND filter (neutral density filter) 29, in that order from the light emitting element 23.

The switching mirror 28 is driven by a first actuator 37. The first actuator 37 has a rotating shaft extending in a direction orthogonal to the distance-measuring optical path from the light emitting element 23 to the fixed mirror 25. The switching mirror 28 is fixed to the rotating shaft of the first actuator 37. The measuring light 30 emitted by the light emitting element 23 is incident on the fixed mirror 25 when the switching mirror 28 is retracted from the distance-measuring optical path between the light emitting element 23 and the fixed mirror 25, and the light (internal reference light) emitted by the light emitting element 23 is reflected by the switching mirror 28 to be incident directly on the incident end surface 26a of the light-receiving optical fiber bundle 26 when the switching mirror 28 is positioned in the distance-measuring optical path between the light emitting element 23 and the fixed mirror 25.

The light-shield mask 61 defines the beam profile of the measuring light 30. The light-shield mask 61 is immovably fixed to a stationary member (not shown) in the electronic distance meter. The ND filter 29 serves as a light-attenuating filter to adjust the amount of light of the measuring light 30 incident on the sighting object 16. The ND filter 29 is driven by a second actuator (mask driver) 36. The second actuator 36 has a rotating shaft extending in a direction parallel to the distance-measuring optical path from the light emitting element 23 to the fixed mirror 25. The ND filter 29 is pivoted at the rotating shaft of the second actuator 36. The optical distance meter 20 is provided in the vicinity of the ND filter 29 with a photo interrupter 35 for sensing the rotational position of the ND filter 29. The photo interrupter 35, the second actuator 36 and the first actuator 37 are electrically connected to a control circuit (controller) 40.

The optical distance meter 20 is provided between an exit end surface 26b of the light-receiving optical fiber bundle 26 and a light receiving element 31 with a condenser lens 32, a ND filter 33 and a band-pass filter 34, in that order from the exit end surface 26b to the light receiving element 31. The ND filter 33 serves as a light-attenuating filter, and is used to adjust the amount of light incident on the light receiving element 31. The ND filter 33 is driven by a third actuator 41. The optical distance meter 20 is provided in the vicinity of the ND filter 33 with a photo interrupter 38 for sensing the rotational position of the ND filter 33. The light receiving element 31 outputs photoelectric current corresponding to the amount of light received. The light receiving element 31, the photo interrupter 38 and the third actuator 41 are electrically connected to the control circuit 40. The electronic distance meter is provided with an indicating device (e.g., an LCD panel) 42 which indicates various kinds of survey information such as information on the AF state and information on operating modes, in addition to the calculated distance.

As known in the art, the optical distance meter 20 establishes two different states: one state wherein the measuring light emitted by the light emitting element 23 is supplied to the fixed mirror 25, and another state wherein the same light (internal reference light) is directly supplied to the incident end surface 26a of the light-receiving optical fiber bundle 26, which are determined in accordance with the switching state of the switching mirror 28 driven by the control circuit 40 via the first actuator 37. As described above, the measuring light supplied to the fixed mirror 25 is projected toward the sighting object 16 via the light transmitting mirror 21a and the objective lens 11, and the measuring light reflected by the sighting object 16 is incident on the incident end surface 26a via the objective lens 11, the wavelength selection mirror 22, and the light receiving mirror 21b. Thereafter, both the measuring light reflected by the sighting object 16 which is incident on the incident end surface 26a, and the internal reference light directly supplied to the incident end surface 26a via the switching mirror 28 are received by the light receiving element 31. The control circuit 40 detects the phase difference (or the time difference) between the reflected light and the internal reference light to calculate the distance from the electronic distance meter to the sighting object 16. The calculated distance is indicated by the indicating device 42. Such an operation of calculating the distance from the phase difference (or the time difference) between the reflected light and the internal reference light is well known in the art.

The electronic distance meter is provided with a lens position sensor 18 for sensing the axial position of the focusing lens 17 on the optical axis thereof, a lens driver 43 for driving the focusing lens 17 along the optical axis thereof, an operating unit (mode selecting device/control panel) 44 and a phase-difference detection AF sensor unit (focus detecting device) 50 which are all connected to the control circuit 40. The operating unit 44 is provided with an AF start switch, a distance measuring operation start switch, and a mode selection switch for switching between a distance measuring mode and a pointer mode.

Figure 2:
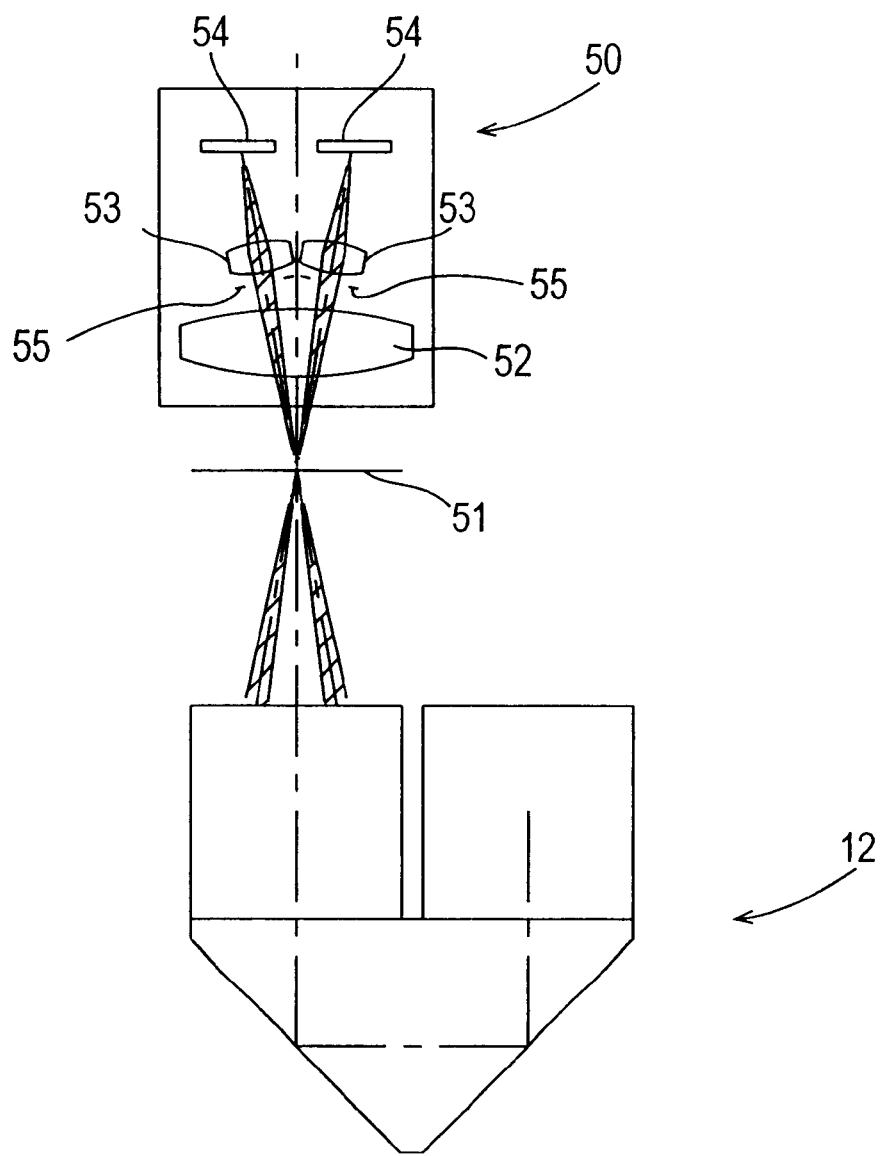
FIG. 2 is a conceptual diagram of an AF sensor unit (a phase-difference detection focus detecting device) and a Porro-prism erecting system, as viewed in the direction of an arrow I shown in FIG. 1.

The Porro-prism erecting system 12 is provided with a beam splitting surface which splits the incident light bundle into two light bundles, so that one of the two light bundles proceeds toward the AF sensor unit 50 while the other light bundle proceeds toward the eyepiece 14. A reference focal plane 51 is formed between the Porro-prism erecting system 12 and the AF sensor unit 50, and is located at a position optically equivalent to the position at which the reticle 15 of the focal-plane plate 13 is provided. The AF sensor unit 50 detects the focus state (i.e., the amount of defocus and direction of focal shift) on the reference focal plane 51. FIG. 2 shows a conceptual diagram of the AF sensor unit 50 and the Porro-prism erecting system 12. The AF sensor unit 50 includes a condenser lens 52, a pair of separator lenses 53, a pair of separator masks 55 located in the close vicinity of the pair of separator lenses 53, and a pair of line sensors (e.g., multi segment CCD sensors) 54 located behind the respective separator lenses 53. The pair of separator lenses 53 are arranged apart from each other by the base length. The image of the sighting object 11 formed on the reference focal plane 51 is separated into two images by the pair of separator lenses 53 to be respectively formed on the pair of line sensors 54. Each of the pair of line sensors 54 includes an array of photoelectric converting elements. Each photoelectric converting element converts the received light of an image into electric charges which are integrated (accumulated), and outputs as an integrated electric charge to the control circuit 40 to constitute AF sensor data. The control circuit 40 calculates an amount of defocus through a predetermined defocus operation in accordance with a pair of AF sensor data respectively input from the pair of line sensors 54. In an autofocus operation, the control circuit 40 drives the focusing lens 17 to bring the sighting object into focus via the lens driver 43 in accordance with the calculated amount of defocus. The defocus operation is well-known in the art.

In the first embodiment of the electronic distance meter shown in FIG. 1, the light-shield mask 61 and a diffraction mask 62 which has a plurality of diffraction apertures (62a through 62f) cause diffraction fringes on the measuring light 30 passed therethrough are provided separately from each other, wherein the diffraction mask 62 is inserted into and retracted from the distance-measuring optical path between the light emitting element 23 and the fixed mirror 25 when the distance measuring mode and the pointer mode are selected with the mode selection switch of the operating unit 44, respectively. The light-shield mask 61 and the diffraction mask 62 will be hereinafter discussed in detail with reference to FIGS. 3A, 3B, 4A and 4B.

Figure 3A:
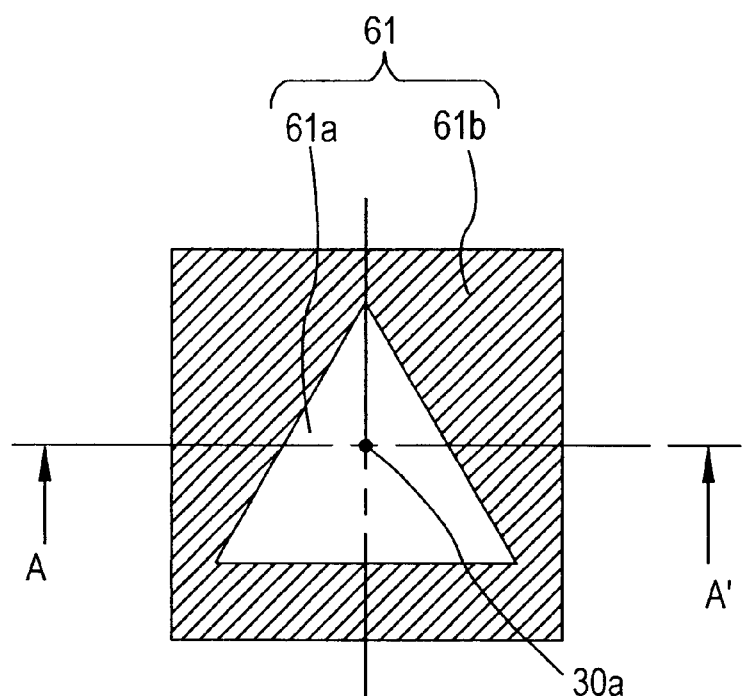
FIG. 3A is a plan view of a first embodiment of a light-shield mask.
Figure 3B:
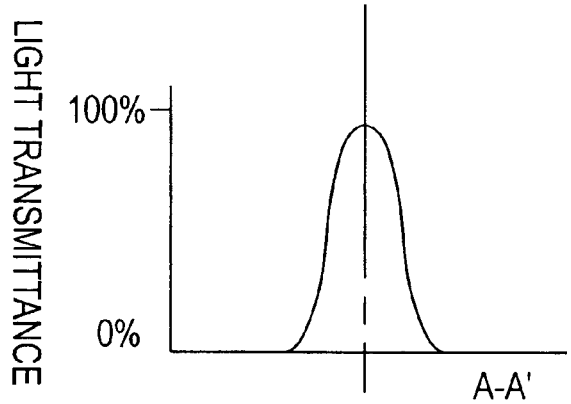
FIG. 3B is a graph showing a distribution of light transmittance of a triangular translucent portion of the light-shield mask shown in FIG. 3A along a cross section taken along A–A' line in FIG. 3A.

FIG. 3A is a plan view of the first embodiment of the light-shield mask 61. The light-shield mask 61 is provided with a triangular translucent portion 61a for defining the beam profile of the measuring light 30, wherein the triangular translucent portion 61a comprises a ND filter having an uneven density. The light transmittance of the ND filter (the triangular translucent portion 61a) gradually decreases in radial directions from an approximate center of the triangular translucent portion 61a toward edges thereof. As shown in FIG. 3B, the light transmittance of the triangular translucent portion 61a has a distribution which is line-symmetrical about the approximate center of the triangular translucent portion 61a. In other words, the light transmittance of the triangular translucent portion 61a has a Gaussian distribution. Note that the cross-hatched portion of the light-shield mask 61 shown in FIG. 3A indicates a light-shield portion 61b having the light transmittance of zero percent.

With such a light transmittance which gradually decreases in radial directions from an approximate center of the triangular translucent portion 61a toward edges thereof, the triangular translucent portion 61a makes it difficult for diffraction to occur in the measuring light 30, thus making it difficult for causing diffraction fringes on the measuring light 30 which is passed through the light-shield mask 61. This allows only a measuring point to be measured even if a periphery of the measuring point is uneven and/or inclined, and hence, the distance measuring operation of the optical distance meter 20 can be achieved with a high degree of precision. In the first embodiment of the electronic distance meter using the first embodiment of the light-shield mask 61, since the measuring light 30 projected toward the sighting object 16 is shaped to have an asymmetrical beam profile with respect to a point, if the sighting object 16 is a corner cube, vignetting of the light reflected by the corner cube which is caused by the light transmitting mirror 21a can be substantially decreased.

Figure 4A:
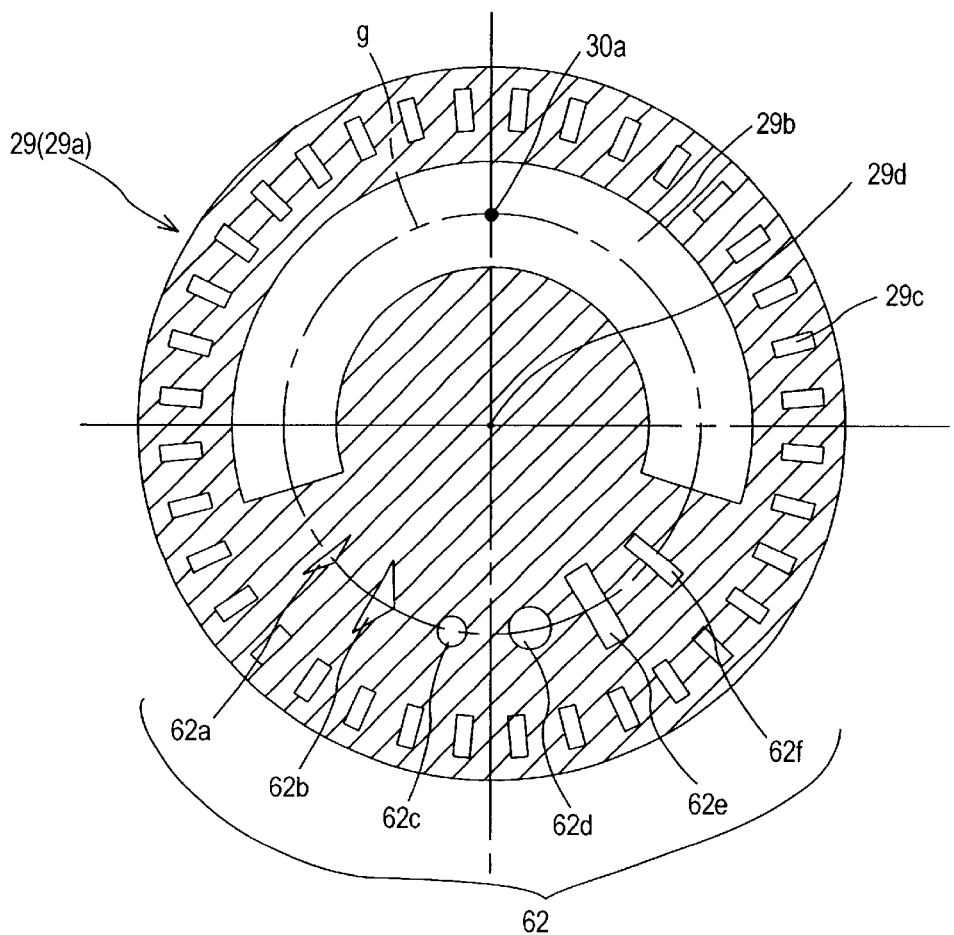
FIG. 4A is a plan view of a ND filter shown in FIG. 1.

FIG. 4A is a plan view of the ND filter 29, wherein the cross-hatched portion thereof indicates a light-shield portion having the light transmittance of zero percent. The diffraction mask 62 is formed on the ND filter 29.

The ND filter 29 comprises a rotary disk 29a, wherein the rotary disk 29a is provided with an arc-shaped ND filter portion 29b and a plurality of radial slits 29c. The rotary disk 29a has a rotational axis 29d parallel to the distance-measuring optical path between the light emitting element 23 and the fixed mirror 25.

Figure 4B:
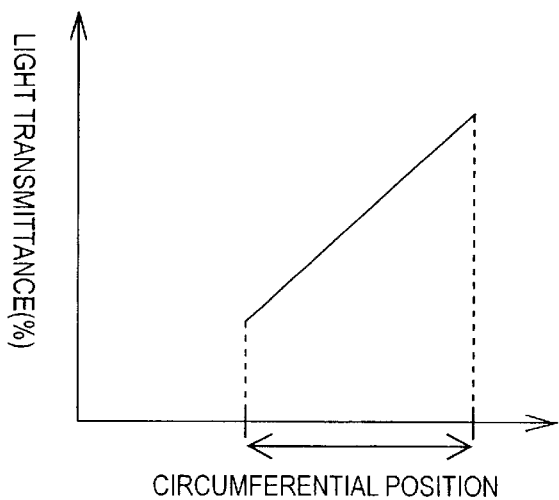
FIG. 4B is a graph showing a distribution of light transmittance of an arc-shaped ND filter portion formed on the ND filter shown in FIG. 4A.

The arc-shaped ND filter portion 29b is positioned on and along a circle g having a predetermined radius about the rotational axis 29d. As shown in FIG. 4A, a central ray 30a of the measuring light 30 intersects the circle g. As shown in FIG. 4B, the light transmittance of the arc-shaped ND filter portion 29b continuously varies in a circumferential direction of the rotary disk 29a. Accordingly, the amount of the measuring light 30 passing through the ND filter 29 can be adjusted by changing the rotational position (angular position) of the arc-shaped ND filter portion 29b. The rotational position of the ND filter 29 is adjusted in accordance with the focus state (i.e., the amount of defocus and direction of focal shift) detected by the AF sensor unit 50.

The plurality of radial slits 29c are formed on the ND filter 29 at equi-angular intervals along a circumference of the arc-shaped ND filter portion 29b about the rotational axis 29d. The plurality of radial slits 29c are used to sense the rotational position of the ND filter 29 (the rotary disk 29a). Namely, each time one slit 29c passes the photo interrupter 35 during rotation of the rotary disk 29a, the photo interrupter 35 outputs a pulse signal. In accordance with the pulse signals output from the photo interrupter 35, the control circuit 40 senses the rotational position of the ND filter 29 (rotary disk 29a). Although not discussed in detail, the radial slits 29c can be of either incremental method type (in which an absolute rotational position is determined) or absolute method type.

The diffraction mask 62 is also formed on the rotary disk 29a. The diffraction mask 62 is provided with six diffraction apertures 62a through 62f, wherein the six diffraction apertures 62a through 62f are arranged on the circle g at different positions thereon. The central ray 30a of the measuring light 30 incidents upon the center of one of the diffraction apertures 62a through 62f or the centerline (the circle g) of the arc-shaped ND filter portion 29b in accordance with the rotational position of the rotary disk 29a.

The six diffraction apertures includes a small triangular aperture 62a, a large triangular aperture 62b, a small circular aperture 62c, a large circular aperture 62d, a large rectangular aperture 62e and a small rectangular aperture 62f, in that order in a counterclockwise direction as viewed in FIG. 4A. The small apertures (the small triangular aperture 62a, a small circular aperture 62c, and the small rectangular aperture 62f) are used in the case where the distance to the sighting object 16 is short, and the large apertures (the large triangular aperture 62b, a large circular aperture 62d, and the large rectangular aperture 62g) are used in the case where the distance to the sighting object 16 is long. Each of the diffraction apertures 62a through 62f is sufficiently smaller than the triangular translucent portion 61a, and has an even light transmittance. Each of the diffraction apertures 62a through 62f acts on the light which is passed through the light-shield mask 61. Namely, the light which is passed through the light-shield mask 61 is diffracted by one of the six apertures 62a, 62b, 62c, 62d, 62e or 62f to produce diffraction fringes at a measuring point.

Figure 5:
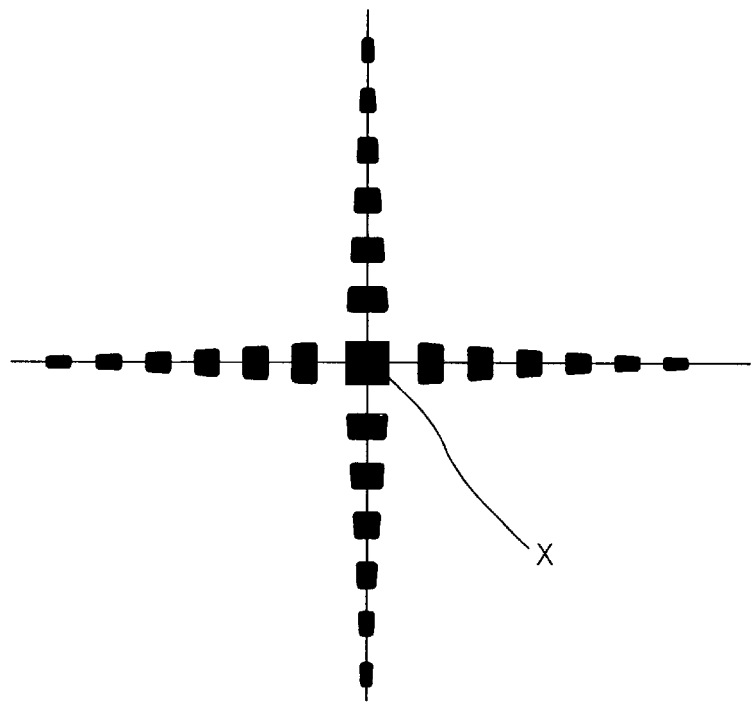
FIG. 5 is a diagram of diffraction fringes which are produced at a measuring point when the measuring light passes through a rectangular aperture of the ND filter shown in FIG. 4A.
Figure 6:
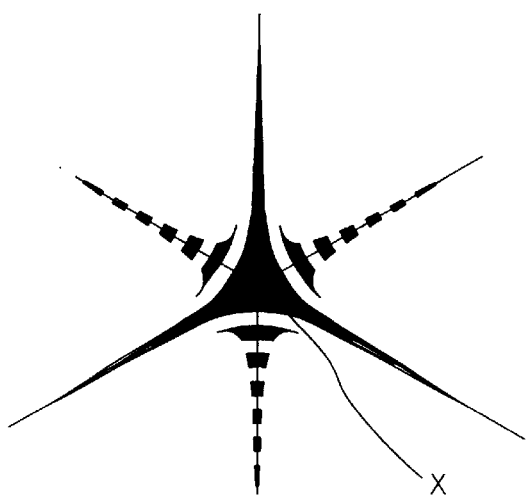
FIG. 6 is a diagram of diffraction fringes which are produced at a measuring point when the measuring light passes through a triangular aperture of the ND filter shown in FIG. 4A.

FIG. 5 shows diffraction fringes produced at a measuring point when the measuring light 30 passes through either the large rectangular aperture 62e or the small rectangular aperture 62f, and FIG. 6 shows diffraction fringes which are produced at a measuring point when the measuring light 30 passes through either the small triangular aperture 62a or the large triangular aperture 62b. The diffraction fringes shown in FIG. 5 spread radially outwards in four radial directions forming the shape of a cross, and the diffraction fringes shown in FIG. 6 spread radially outwards in six radial directions forming the shape of a star (hexagram). In either case, an intersection X exists at a point of intersection of the four or six directions thereof. The intersection X coincides with the center ray 30a of the measuring light 30. Accordingly, the center of the measuring light 30 spot on the sighting object 16 can easily be visually perceived by sighting the intersection X through a collimator (not shown) which is attached to the sighting telescope 10. This makes it easy for the surveyor to adjust the direction of the sighting telescope 10 for collimation.

As has been described above, the first embodiment of the diffraction mask 62 has the six diffraction apertures 62a through 62f having different shapes. The surveyor can freely select a diffraction aperture from among the six diffraction apertures 62a through 62f in accordance with the distance to the sighting object 16 or the purpose of distance measurement. For instance, there is often the case that diffraction fringes are inconspicuous in the case where the distance to the sighting object 16 is extremely short. In this case, it is desirable that either the small circular aperture 62c or the large circular aperture 62d be used. Alternatively, the control circuit 40 can automatically select an appropriate diffraction aperture from among the six diffraction apertures 62a through 62f in accordance with the focus state (i.e., the amount of defocus and direction of focal shift) detected by the AF sensor unit 50.

The ND filter 29, which has the arc-shaped ND filter portion 29b and the diffraction mask 62 which are formed on the rotary disk 29a, is driven to rotate by control of the control circuit 40 via the second actuator 36 in accordance with the selection of the mode selection switch of the operating unit 44 between the distance measuring mode and the pointer mode. When the distance measuring mode is selected with the mode selection switch, the ND filter 29 is rotated so that the arc-shaped ND filter portion 29b is inserted into the distance-measuring optical path between the light emitting element 23 and the fixed mirror 25. When the pointer mode is selected with the mode selection switch, the ND filter 29 is rotated so that one of the six diffraction apertures 62a through 62f is inserted from the distance-measuring optical path between the light emitting element 23 and the fixed mirror 25.

Figure 7:
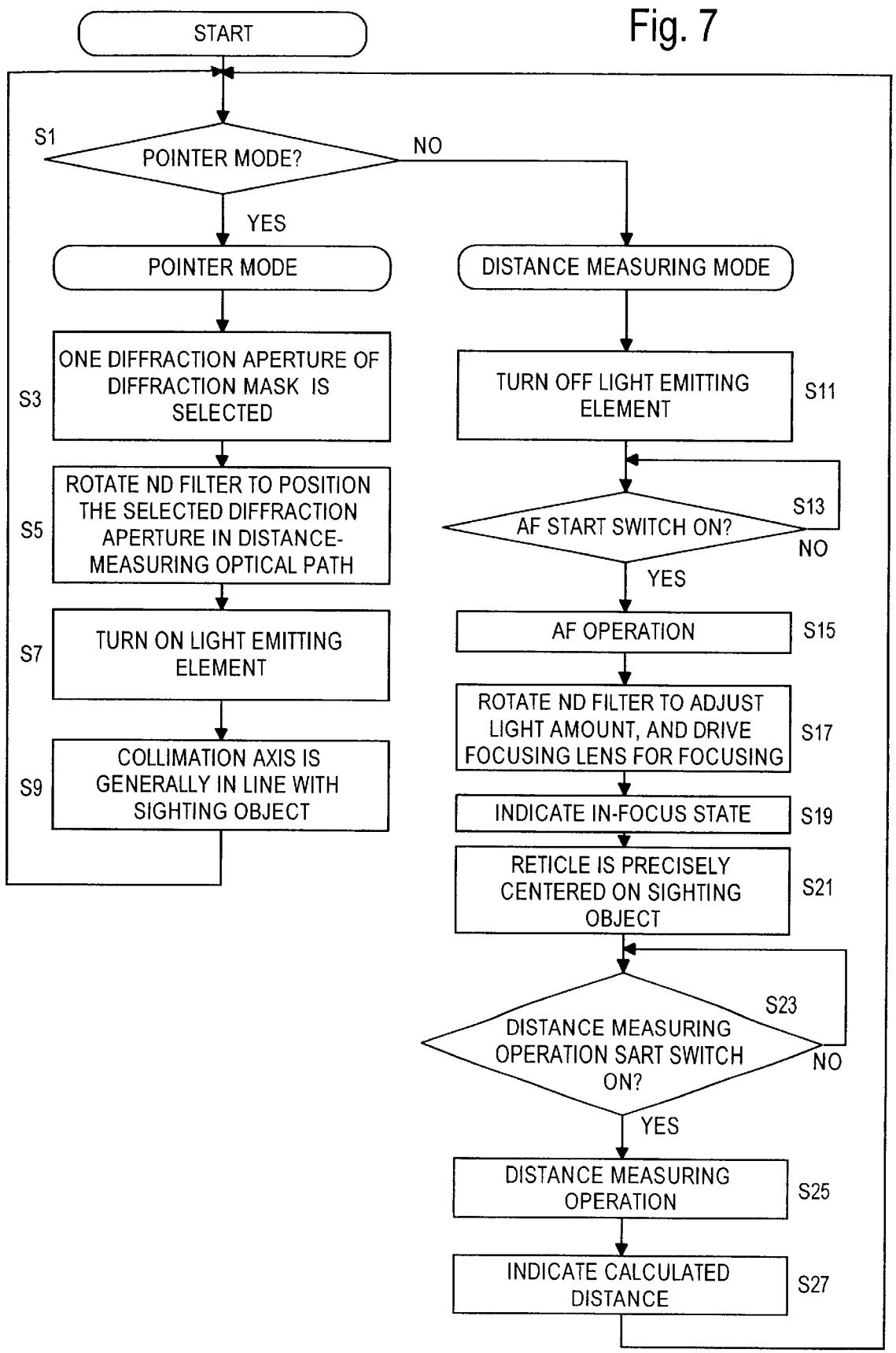
FIG. 7 is a flow chart showing an operating procedure of the electronic distance meter shown in FIG. 1.

FIG. 7 is a flow chart showing a general operating procedure of the electronic distance meter shown in FIG. 1. Firstly, the surveyor selects either the distance measuring mode or the pointer mode with the mode selection switch of the operating unit 44 (step S1). When it is difficult to aim the collimation axis 10a of the sighting telescope 10 at the sighting object 16, it is desirable for the surveyor select the pointer mode first to adjust the direction of the sighting telescope 10 for collimation so that the collimation axis 10a of the sighting telescope 10 is generally in line with the sighting object 16, and thereafter select the distance measuring mode to perform distance measuring operation.

If the surveyor selects the pointer mode (if YES at step S1), then the surveyor selects a diffraction aperture from among the six diffraction apertures 62a through 62f with the operating unit 44 (step S3). Upon selection of one diffraction aperture, the control circuit 40 actuates the second actuator 36 to rotate the ND filter 29 (the rotary disk 29a) so that the selected diffraction aperture is positioned in the distance-measuring optical path between the light emitting element 23 and the fixed mirror 25 (step S5). The indicating device 42 indicates which of the six diffraction apertures 62a through 62f has been selected. Immediately after the selected diffraction aperture is positioned in the distance-measuring optical path, the control circuit 40 activates the light emitting element 23 to emit the measuring light 30 (step S7). The measuring light 30 emitted from the light emitting element 23 is projected toward the sighting object 16 through the diffraction aperture selected at step S5 after the measuring light 30 is shaped into a triangular beam profile via the triangular translucent portion 61a of the light-shield mask 61.

Subsequently, the surveyor aims the sighting telescope 10 at the sighting object 16 so that the collimation axis 10a of the sighting telescope 10 is generally in line with the sighting object 16, while viewing the sighting object 16 through a collimator (not shown) which is attached to the sighting telescope 10 (step S9). The surveyor can see both the sighting object 16 and radially-spreading diffraction fringes (e.g., the diffraction fringes shown in FIG. 5 or 6) at the same time, which are produced when the measuring light 30 passes through the selected diffraction aperture. The center (the intersection X shown in FIGS. 5 and 6) of the diffraction fringes coincides with the central ray 30a of the measuring light 30 and the collimation axis 10a of the sighting telescope 10. Accordingly, the surveyor can easily adjust the direction of the sighting telescope 10 for collimation by positioning the center of the diffraction fringes on the sighting object 16. After the surveyor adjusts the direction of the sighting telescope 10 in the above described manner, the surveyor selects the distance measuring mode with the mode selection switch of the operating unit 44 to perform the aforementioned autofocus operation.

If the surveyor selects the distance measuring mode (if NO at step S1), the control circuit 40 turns OFF the light emitting element 23 (step S11). Subsequently, it is determined whether the AF start switch of the operating unit 44 is ON (step S13). If the AF start switch of the operating unit 44 is ON (if YES at step S13), the control circuit 40 actuates the AF sensor unit 50 to perform an autofocus operation (step S15). Upon the AF start switch being turned ON, the control circuit 40 actuates the second actuator 36 to rotate the ND filter 29 (the rotary disk 29a) to insert the arc-shaped ND filter portion 29b into the distance-measuring optical path between the light emitting element 23 and the fixed mirror 25 so that the amount of the measuring light 30 projected toward the sighting object 16 becomes optimum in accordance with the focus state on the reference focal plane 51 that is detected by the AF sensor unit 50, while the control circuit 40 drives the focusing lens 17 to bring the sighting object 16 into focus via the lens driver 43 in accordance with the calculated amount of defocus (step S17). Subsequently, the indicating device 42 indicates that the sighting telescope 10 is in focus relative to the sighting object 16 (step S19). Subsequently, after visually checking the in-focus state of the sighting telescope 10 via the indicating device 42, the surveyor adjusts the direction of the sighting telescope 10 so that the reticle (cross hair) 15 viewed through the eyepiece 14 is precisely centered on the sighting object 16 while looking into the eyepiece 14 (step S21). Thereafter, the surveyor turns ON the distance measuring operation start switch of the operating unit 44.

It is determined at step S23 whether the distance measuring operation start switch of the operating unit 44 is ON. If the distance measuring operation start switch is ON (if YES at step S23), the control circuit 40 activates the light emitting element 23 to emit the measuring light 30 to perform the distance measuring operation (step S25).

In this distance measuring operation, firstly, the switching mirror 28 is retracted from the distance-measuring optical path via the first actuator 37 so that the measuring light 30 which is emitted by the light emitting element 23 and passed through the light-shield mask 61 and the ND filter 29 (the arc-shaped ND filter portion 29b) is incident on the fixed mirror 25 to be projected toward the sighting object 16 via the objective lens 11 and so that the light reflected by the sighting object 16 is received by the light receiving element 31. Subsequently, the switching mirror 28 is inserted into the distance-measuring optical path via the first actuator 37 so that the light (internal reference light) which is emitted by the light emitting element 23 and passed through the light-shield mask 61 is reflected by the switching mirror 28 to be incident directly onto the incident end surface 26a of the light receiving optical fiber 26 to be eventually received by the light receiving element 31. Subsequently, in accordance with the output from the light receiving element 31, the control circuit 40 detects the phase difference (or the time difference) between the reflected light and the internal reference light to calculate the distance from the electronic distance meter to the sighting object 16.

Subsequently, the control circuit 40 brings indicates the calculated distance into view on the indicating device 42 (step S27).

In the first embodiment of the light-shield mask 61, the triangular translucent portion 61a of the light-shield mask 61 can be modified to have any other shape. For instance, the light-shield mask 61 can be formed to have a rectangular, circular or elliptical translucent portion which corresponds to the shape of the translucent portion 61a. It is easy and practical to produce the light-shield mask 61 having such a rectangular, circular or elliptical translucent portion. As known in the art, if the measuring light 30 projected toward the sighting object 16 is shaped to have an asymmetrical beam profile with respect to a point, and if the sighting object 16 is a corner cube, vignetting of the light reflected by the corner cube which is caused by the light transmitting mirror 21a can be substantially decreased. In this case, each of the light transmitting mirror 21a and the light receiving mirror 21b needs to have substantially the same shape as the shape of the triangular translucent portion 61a of the light-shield mask 61.

Figure 8:
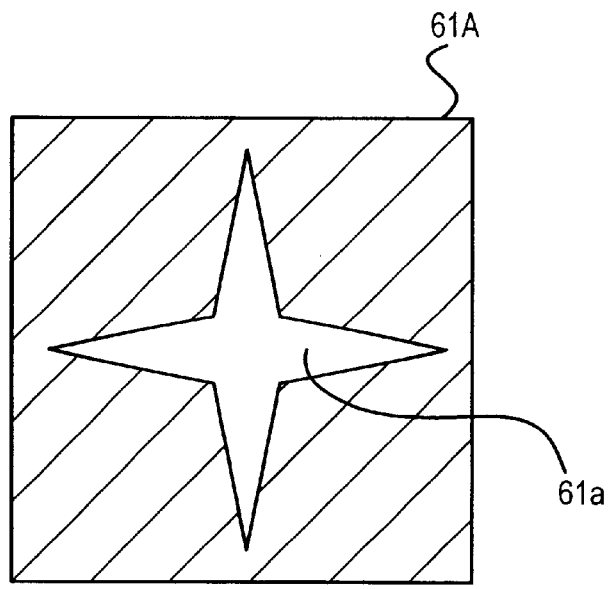
FIG. 8 is a plan view of a second embodiment of the light-shield mask.
Figure 9:
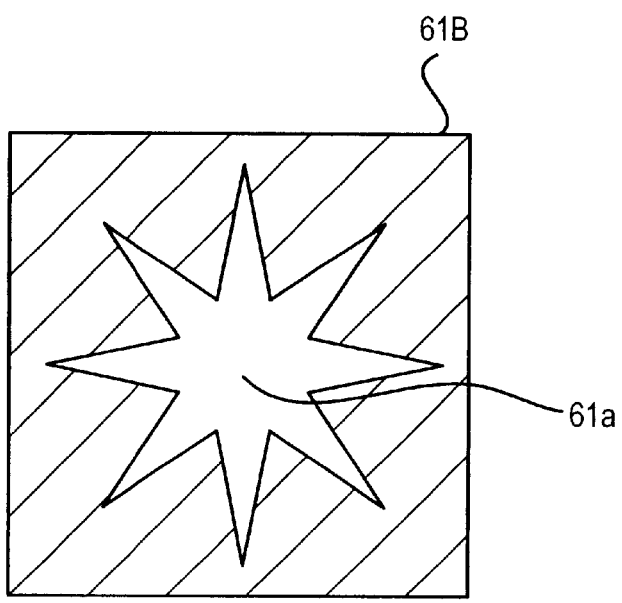
FIG. 9 is a plan view of a third embodiment of the light-shield mask.

If the light-shield mask 61 is replaced by a light-shield mask 61A shown in FIG. 8 or a light-shield mask 61B shown in FIG. 9 which are provided with a translucent portion having a particular shape (e.g., a cross-shaped translucent portion 61a or a star-shaped translucent portion 61d) which makes it easy for the surveyor to visually perceive the center of the measuring light 30 spot on the sighting object 16, in the pointer mode, the surveyor can visually perceive the center of the measuring light 30 spot on the sighting object 16 without causing the measuring light 30 to generate diffraction fringes at a measuring point such as those shown in FIGS. 5 and 6 by the diffraction mask 62 of the ND filter 29. However, if the light-shield mask 61A or 61B is adopted, the measuring light 30 passing through the light-shield mask 61A or 61B decreases by a large amount since the light shielding area thereof is greater than that of the light-shield mask 61 shown in FIG. 3A. Accordingly, the light-shield mask 61A and 61B is desirably used for a short-range optical distance meter which can measure distances with a high precision even if the amount of the measuring light 30 is small. In addition, if the light-shield mask 61A and 61B is applied to a wide-range optical distance meter which covers from a short distance to a long distance, the ND filter 29 needs to be modified so that a plurality of star-shaped or cross-shaped translucent portions each having an uneven light transmittance are formed. In this case, the plurality of star-shaped or cross-shaped translucent portions of the ND filter 29 are selectively used in accordance with the calculated distance. Although the pointer mode is used to adjust the direction of the sighting telescope 10 for collimation so that the collimation axis 10a of the sighting telescope 10 is generally in line with the sighting object 16 before the distance measuring operation is performed as has been described above, the pointer mode can also be used marking is applied to the sighting object 16.

Figure 10:
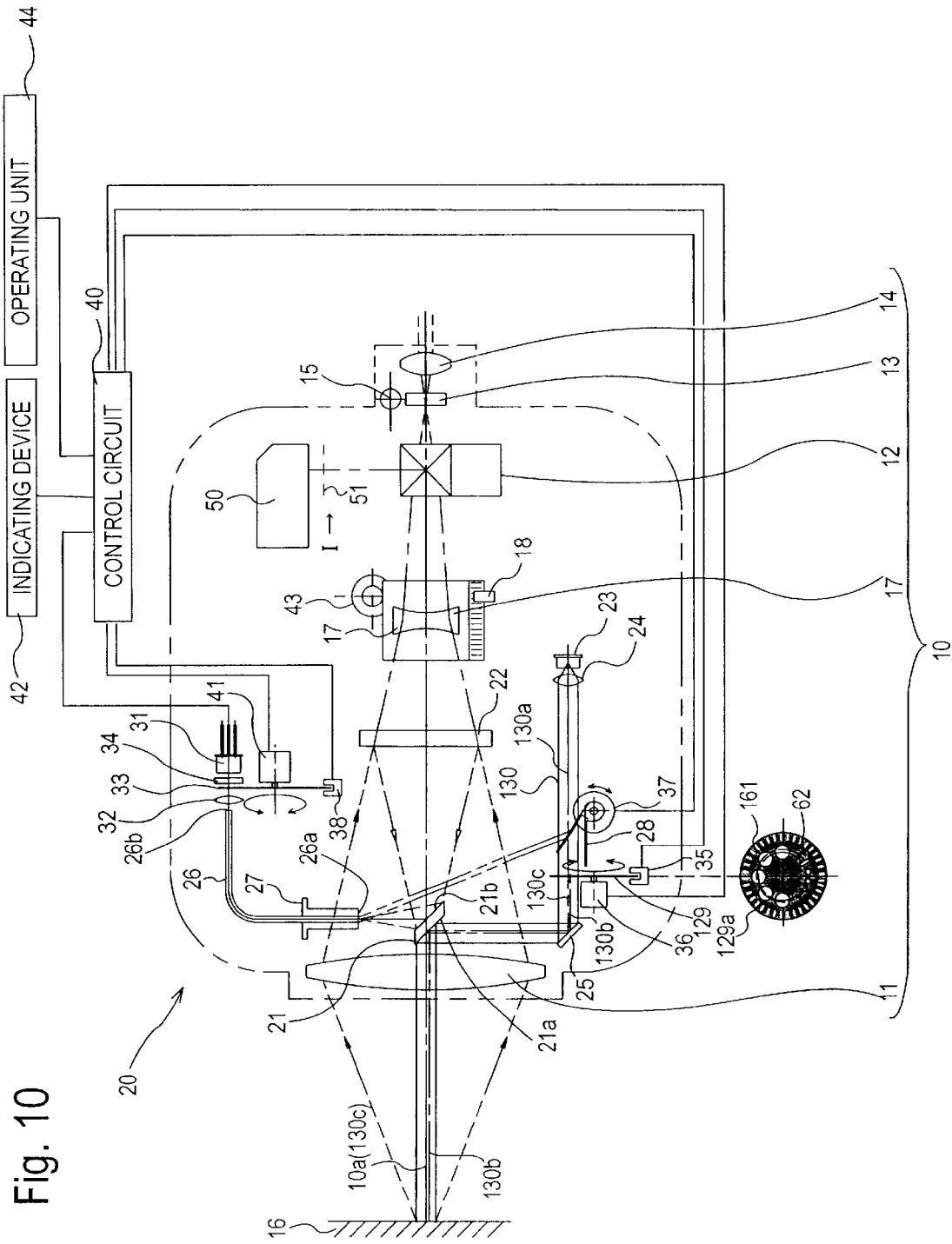
FIG. 10 is a schematic diagram of a second embodiment of the electronic distance meter equipped with an autofocus system, according to the present invention.
Figure 11:
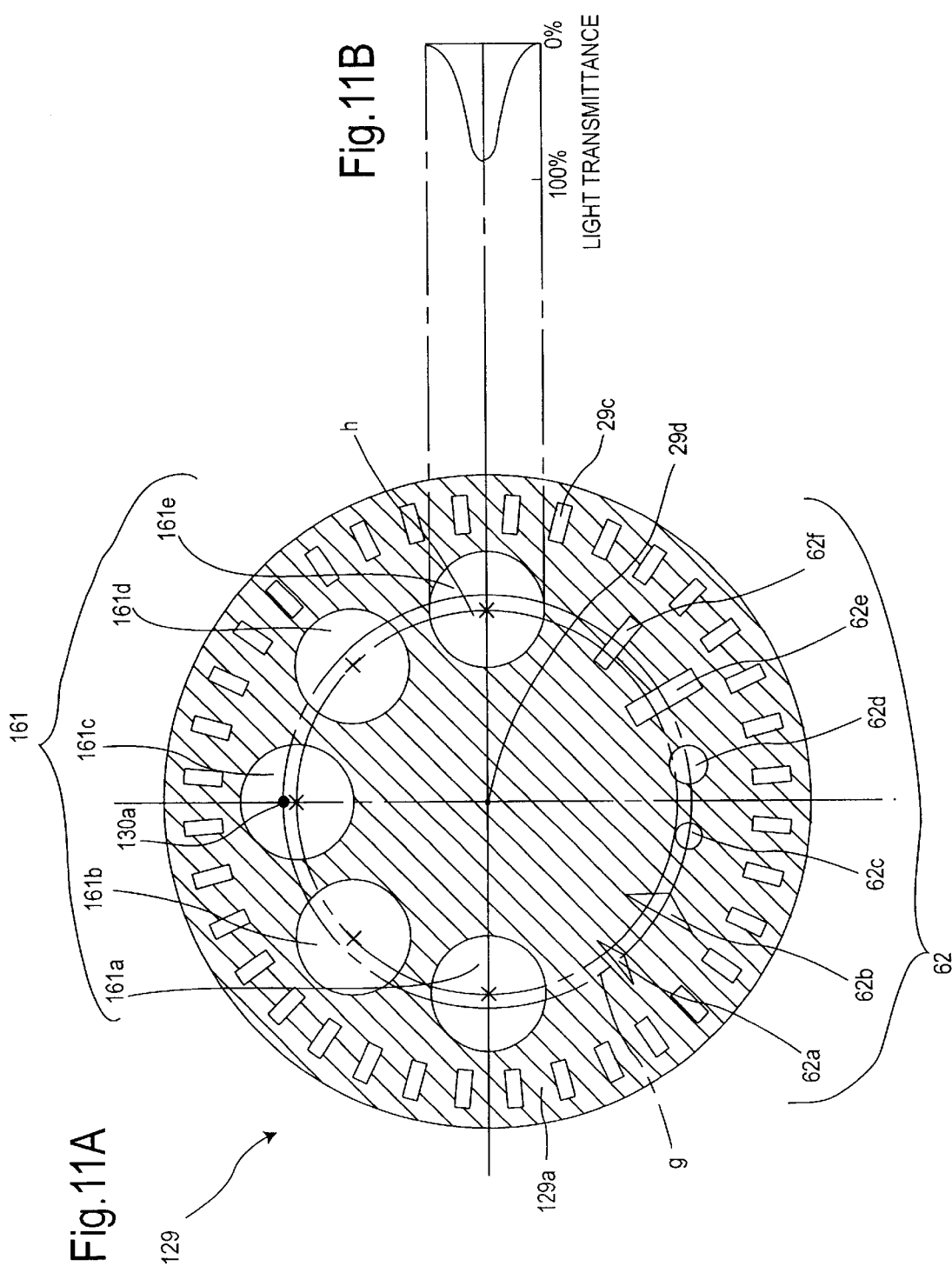
FIG. 11A is a plan view of a ND filter shown in FIG. 10 which filters out part of the measuring light which is emitted from a light emitting element to be projected toward a target.
FIG. 11B is a graph showing a distribution of light transmittance of a circular translucent portion formed on the ND filter shown in FIG. 11A.
Figure 12:
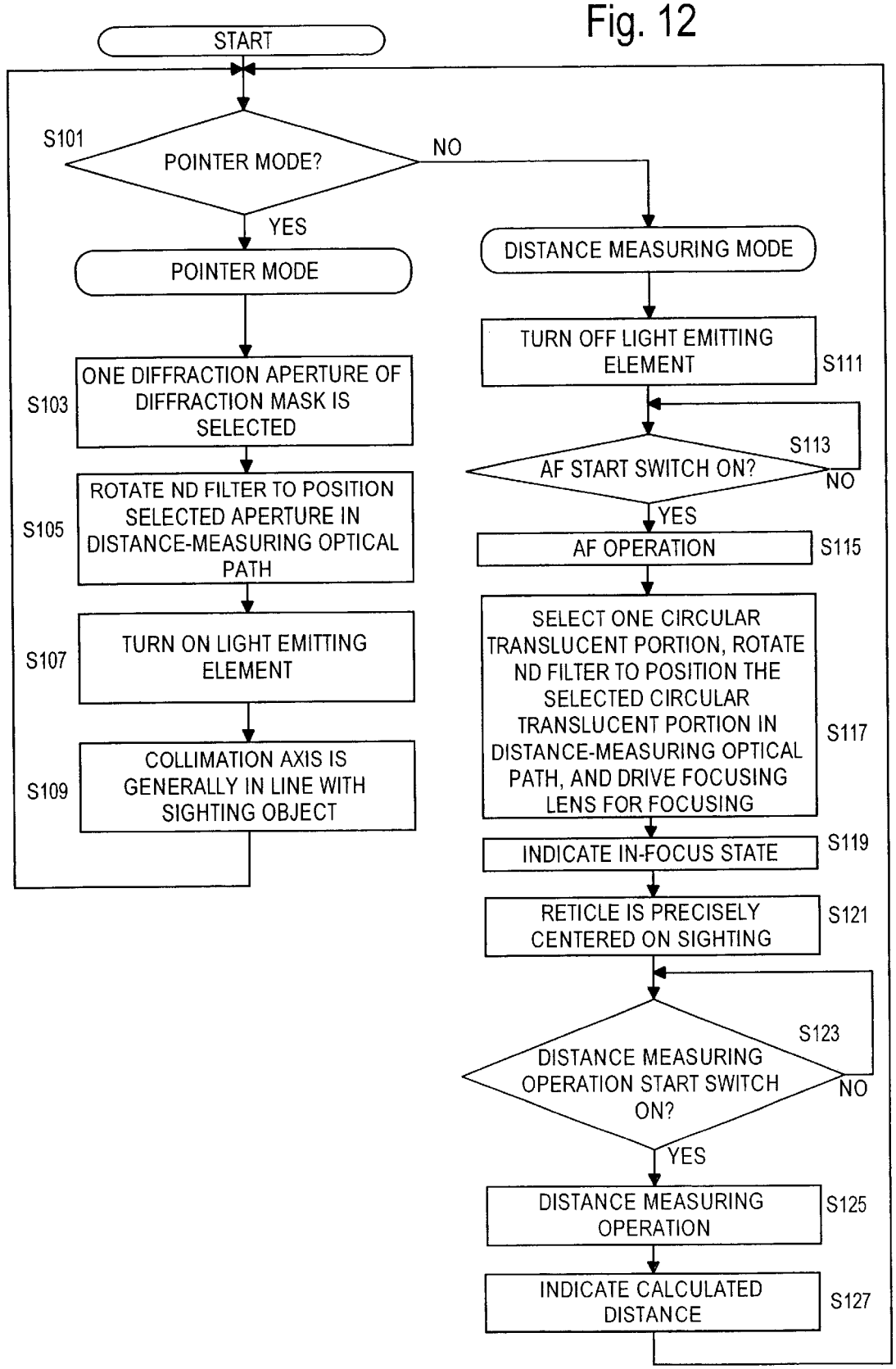
FIG. 12 is a flow chart showing an operating procedure of the electronic distance meter shown in FIG. 10.

FIGS. 10 through 12 show the second embodiment of the electronic distance meter equipped with an autofocus system, according to the present invention. This embodiment is substantially the same as the first embodiment of the electronic distance meter shown in FIG. 1 except that the ND filter 29 having the arc-shaped ND filter portion 29b is replaced by an ND filter 129 having a light-shield mask 161 including five circular translucent portions 161a through 161e and that the light-shield mask 61 shown in FIGS. 1 and 3A is omitted. In other words, the arc-shaped ND filter portion 29b and the light-shield mask 61 in the first embodiment of the electronic distance meter are replaced by the light-shield mask 161 in the second embodiment of the electronic distance meter. In the second embodiment of the electronic distance meter, one of the five circular translucent portions 161a through 161e or one of the six diffraction apertures 62a through 62f are selectively positioned in the distance-measuring optical path between the light emitting element 23 and the fixed mirror 25 depending on whether the distance-measuring mode or the pointer mode is selected. Parts and elements of the second embodiment of the electronic distance meter which are similar to those of the first embodiment of the electronic distance meter are designated by the same reference numerals. Accordingly, only the aspects of the second embodiment of the electronic distance meter which are different from those of the first embodiment of the electronic distance meter will be hereinafter discussed.

FIG. 11A is a plan view of the ND filter 129, wherein the cross-hatched portion thereof indicates a light-shield portion having the light transmittance of zero percent. The ND filter 129 comprises a rotary disk 129a which corresponds to the rotary disk 29a shown in FIG. 4A. As shown in FIG. 11A, the light-shield mask 161 and the diffraction mask 62 are formed on the rotary disk 129a at different radius positions from the rotational axis 29d of the rotary disk 129a. The six diffraction apertures 62a through 62f of the diffraction mask 62 are arranged on and along the circle g at different positions thereon, while the five circular translucent portions 161a through 161e of the light-shield mask 161 are arranged on and along the circle h at different positions thereon. The radius of the circle h is smaller than the radius of the circle g. The circle g which is coincident with each locus of the center of the six diffraction aperture 62a through 62f intersects the central ray 130a of the measuring light 130 emitted from the light emitting element 23, while the circle h which is coincident with each locus of the center of the five circular translucent portions 161a through 161e deviates radially inwards from the central ray 130a of the measuring light 130 by a slightly amount.

The light-shield mask 161 is provided over each of the five circular translucent portion 161a through 161e with a ND filter having an uneven density. In FIG. 11A, each center point of the five circular translucent portions 161a through 161e is shown by an 'x' mark. In each of the five circular translucent portions 161a through 161e, the light transmittance of the ND filter (circular translucent portion) gradually decreases in a direction radially outwards from the center of the circular translucent portion so that diffraction fringes do not occur easily at the circular edge of the circular translucent portion. FIG. 11B is a graph showing a distribution of light transmittance of the circular translucent portion 161e by way of example. Specifically, the respective ND filters of the five circular translucent portions 161a through 161e have different light transmittances so that the amount of the measuring light 130 passing through the light-shield mask 161 can be adjusted by selectively positioning the five circular translucent portions 161a through 161e in the distance-measuring optical path between the light emitting element 23 and the fixed mirror 25. The beam of the measuring light 130 emitted from the light emitting element 23 is determined so that the measuring light 130 passes through one of the five circular translucent portions 161a through 161e without interfering with adjacent circular translucent portions, and so that at least part of the measuring light 130 which is passed through one of the five circular translucent portions 161a through 161e travels along on the collimation axis 10a.

When the distance-measuring mode is selected with the mode selection switch of the operating unit 44, the measuring light 130 emitted from the light emitting element 23 passes through a circular translucent portion selected from among the five circular translucent portions 161a through 161e, and thereafter is projected toward the sighting object 16 via the fixed mirror 25, the light transmitting mirror 21a and the objective lens 11. The distance measuring optical path from the light transmitting mirror 21a to the sighting object 16 is parallel to the collimation axis 10a of the sighting telescope 10 and also includes the collimation axis 10a, while the central ray 130b of the measuring light 130 passed through the light-shield mask 161 is not coincident with the collimation axis 10a. According to this arrangement wherein the central ray 130b of the measuring light 130 deviates from the collimation axis 10a between the light transmitting mirror 21a and the sighting object 16, if the sighting object 16 is a corner cube, vignetting of the light reflected by the corner cube which is caused by the light transmitting mirror 21a can be substantially decreased. Moreover, no diffraction fringes occur. Consequently, a distance measuring operation of the optical distance meter 20 is achieved with a high degree of precision.

On the other hand, when in the pointer mode, the measuring light 130 emitted from the light emitting element 23 passes through a diffraction aperture selected from among the six diffraction apertures 62a through 62f, and thereafter travels on the collimation axis 10a of the sighting telescope 10. The distance-measuring optical path from the light transmitting mirror 21a to the sighting object 16 is parallel to the collimation axis 10a of the sighting telescope 10 and also includes the collimation axis 10a, and the central ray 130c of the measuring light 130 passed through the diffraction mask 62 is coincident with the collimation axis 10a between the light transmitting mirror 21a and the sighting object 16. According to this arrangement wherein the central ray of the measuring light 130 is coincident with the collimation axis 10a from the light transmitting mirror 21a to the sighting object 16, the measuring light 130 is used as a pointer for collimation. Consequently, the direction of the sighting telescope 10 can be adjusted for collimation with a high precision while a marking operation can be carried out with a high precision.

FIG. 12 is a flow chart showing an operating procedure of the second embodiment of the electronic distance meter shown in FIG. 10. Operations at steps S101 through S115 and steps S119 through S127 are identical to operations at steps S1 through S15 and steps S19 through S27 in FIG. 7, respectively. Accordingly, only the operation at step S117 will be hereinafter discussed.

At step S117, the control circuit 40 selects that circular translucent portion from among the five circular translucent portions 161a through 161e which optimizes the amount of the measuring light 130 that is projected toward the sighting object 16 in accordance with the focus state on the reference focal plane 51 that is detected by the AF sensor unit 50, and subsequently the control circuit 40 actuates the second actuator 36 to rotate the ND filter 129 (the rotary disk 129a) to insert the selected circular translucent portion 161a, 161b, 161c, 161d or 161e into the distance-measuring optical path between the light emitting element 23 and the fixed mirror 25, while the control circuit 40 drives the focusing lens 17 to bring the sighting object 16 into focus via the lens driver 43 in accordance with the calculated amount of defocus.

According to the second embodiment of the electronic distance meter shown in FIG. 10, effects similar to those achieved in the first embodiment of the electronic distance meter are achieved. In addition, vignetting caused by the light transmitting mirror 21a can be substantially decreased in the distance measuring mode by an optical arrangement wherein the central ray 130b of the measuring light 130 passed through the light-shield mask 161 deviates from the collimation axis 10a. Moreover, the measuring light 130 can be used as a pointer for collimation in the pointer mode by an optical arrangement wherein the central ray 130c of the measuring light 130 passed through the diffraction mask 62 is coincident with the collimation axis 10a of the sighting telescope 10 from the light transmitting mirror 21a to the sighting object 16. Note that the above-mentioned two effects can be achieved by rotating the ND filter 12 only.

Figure 13:
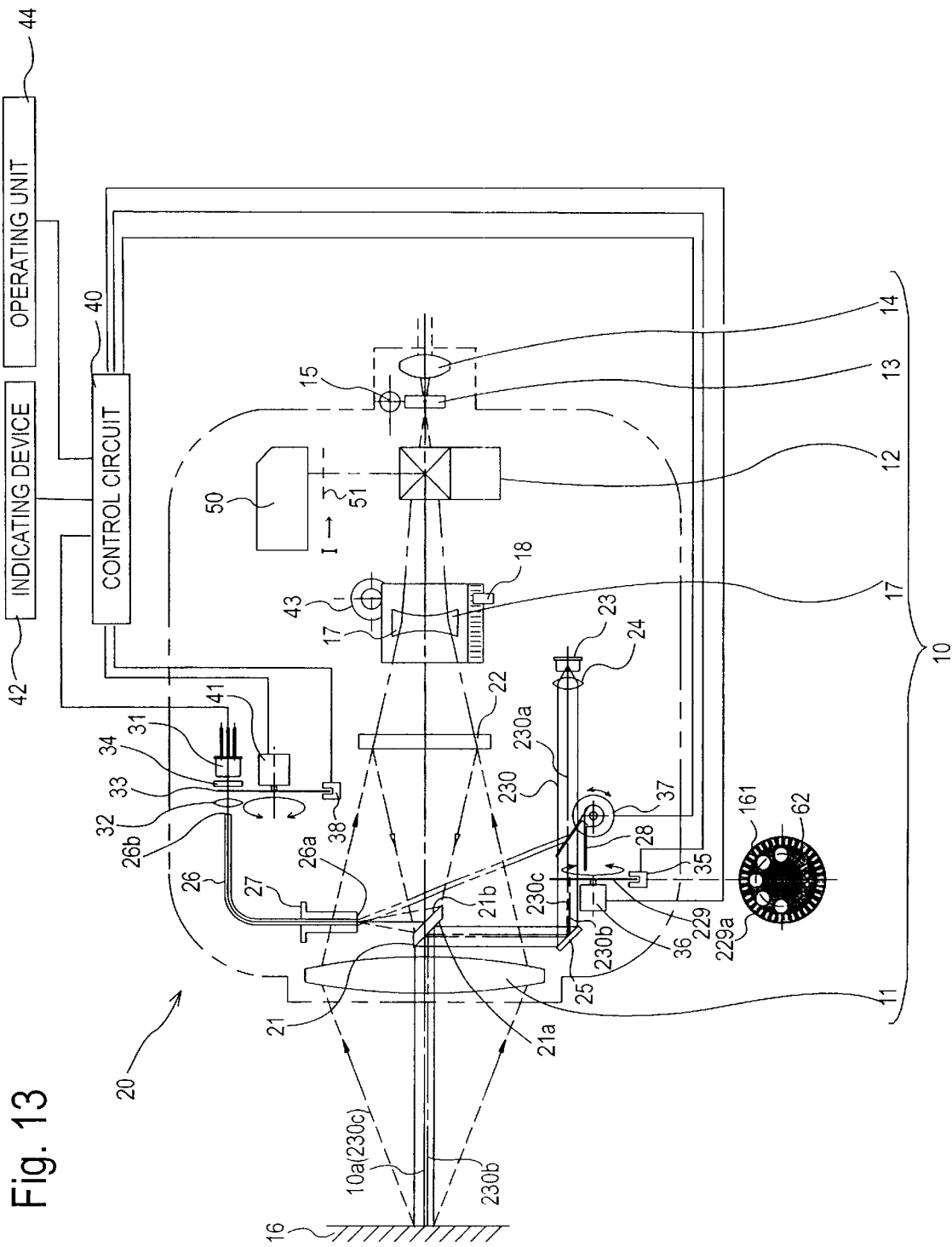
FIG. 13 is a schematic diagram of a third embodiment of the electronic distance meter equipped with an autofocus system, according to the present invention.
Figure 14A:
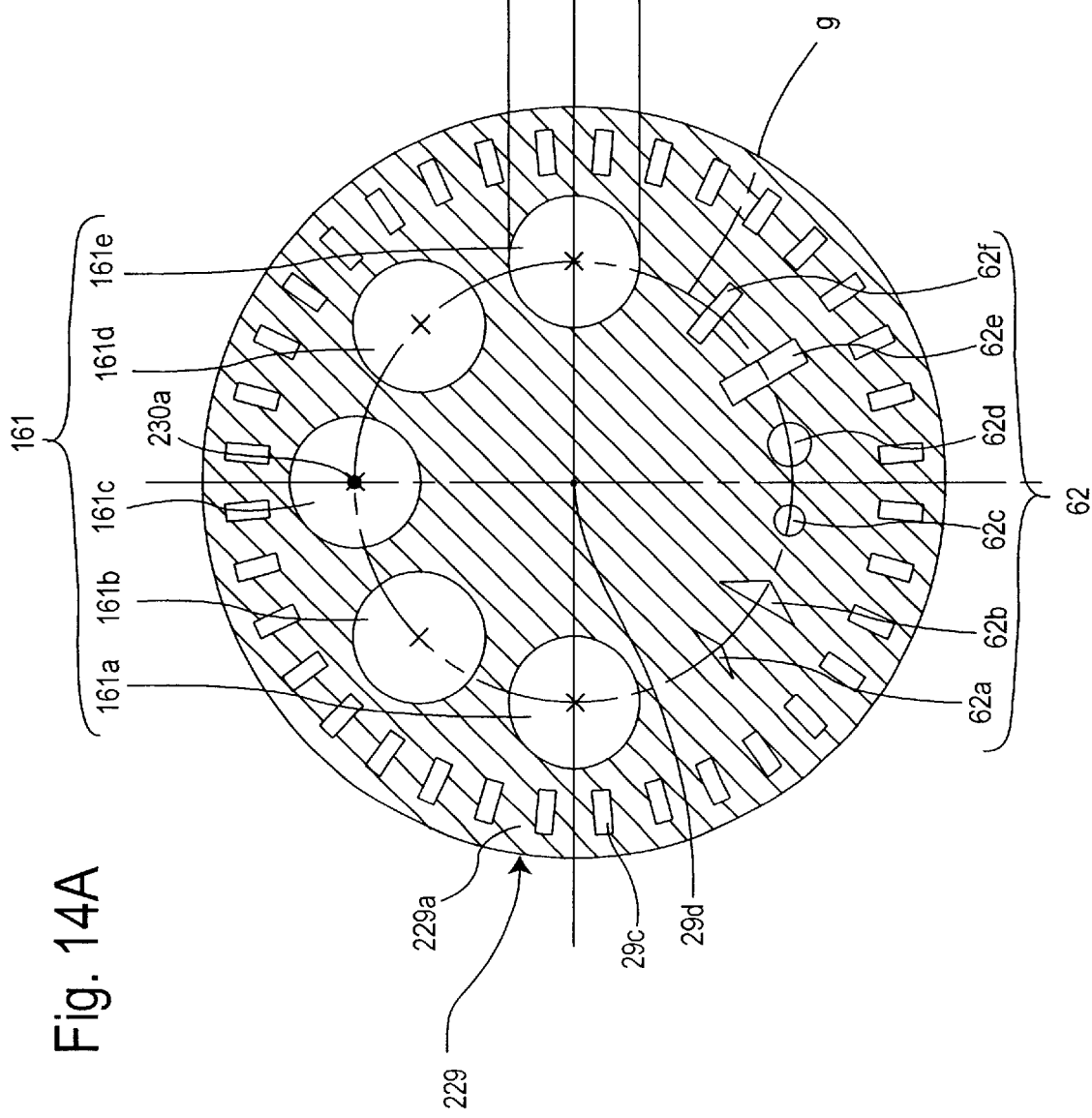
FIG. 14A is a plan view of a ND filter shown in FIG. 13.
Figure 14B:
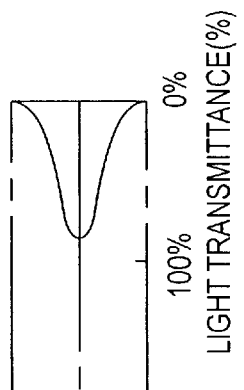
FIG. 14B is a graph showing a distribution of light transmittance of a circular translucent portion formed on the ND filter shown in FIG. 14A.
Figure 15:
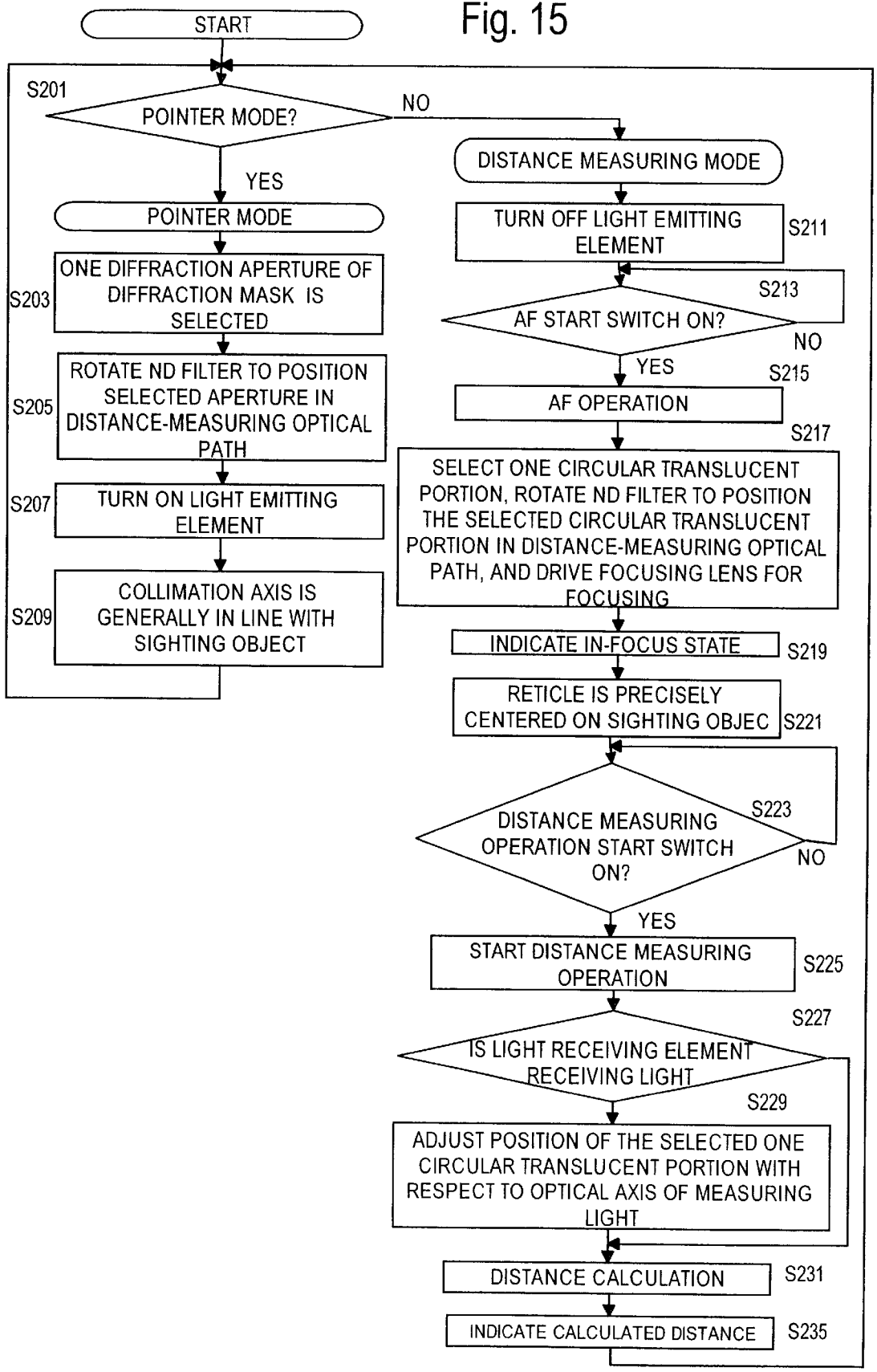
FIG. 15 is a flow chart showing an operating procedure of the electronic distance meter shown in FIG. 13.

FIGS. 13 through 15 show the third embodiment of the electronic distance meter equipped with an autofocus system, according to the present invention. As shown in FIG. 14A, the five circular translucent portions 161a through 161e and the six diffraction apertures 62a through 62f are arranged on a rotary disk 229a of a ND filter 229 (which corresponds to the rotary disk 129a of the ND filter 129 shown in FIG. 11A) on and along the circle g at different positions thereon, wherein the circle g intersects a central ray 230a of a measuring light 230 (which corresponds to the central ray 130a of the measuring light 130 shown in FIG. 10). In FIG. 14A, each center point of the five circular translucent portion 161a through 161e is shown by an 'x' mark. One of the five circular translucent portions 161a through 161e of the light-shield mask 161 or one of the six diffraction apertures 62a through 62f of the diffraction mask 62 are selectively positioned in the distance-measuring optical path between the light emitting element 23 and the fixed mirror 25 depending on whether the distance-measuring mode or the pointer mode is selected. In addition, in the distance-measuring mode the position of the selected one of the five circular translucent portions 161a through 161e with respect to the central ray 230a of the measuring light 230 is adjusted in accordance with the output from the light receiving element 31 to prevent vignetting caused by the light transmitting mirror 21a from occurring. Parts and elements of the third embodiment of the electronic distance meter which are similar to those of the second embodiment of the electronic distance meter are designated by the same reference numerals. Accordingly, only the points of the third embodiment of the electronic distance meter which are different from those of the second embodiment of the electronic distance meter will be hereinafter discussed.

FIG. 14A is a plan view of the ND filter 229, wherein the cross-hatched portion thereof indicates a light-shield portion having the light transmittance of zero percent. The ND filter 229 comprises a rotary disk 229a which corresponds to the rotary disk 29a shown in FIG. 4A. As described above, the five circular translucent portions 161a through 161e of the light-shield mask 161 and the six diffraction apertures 62a through 62f of the diffraction mask 62 are formed on the rotary disk 229a at same radius positions (the circle g) from the rotational axis 29d of the rotary disk 129a, wherein the radius positions intersects the central ray 230a of the measuring light 230. When one of the five circular translucent portions 161a through 161e or one of the six diffraction apertures 62a through 62f is positioned in the distance-measuring optical path between the light emitting element 23 and the fixed mirror 25, the measuring light 230 passes through the center of the circular translucent portion or the center of the diffraction aperture which is positioned in the distance-measuring optical path. Accordingly, the measuring light 230 travels on the collimation axis 10a of the sighting telescope 10 therealong after passing through one of the five circular translucent portions 161a through 161e and the six diffraction apertures 62a through 62f. Therefore, the central ray 230a of the measuring light 230 is coincident with the collimation axis 10a, from the light transmitting mirror 21a forwards (to the left as viewed in FIG. 13).

If the central ray 230a of the measuring light 230 is coincident with the collimation axis 10a from the light transmitting mirror 21a to the sighting object 16 and if the sighting object 16 is a corner cube, vignetting of the light reflected by the corner cube which is caused by the light transmitting mirror 21a occurs, thereby making it impossible for the light receiving element 23 to receive the light reflected by the sighting object 16 enough even if the measuring light 230 is projected toward the sighting object 16.

To prevent this problem from occurring, in this third embodiment of the electronic distance meter, the control circuit 40 determines whether vignetting caused by the light transmitting mirror 21a is occurring. If the vignetting occurs, the control circuit 40 rotates the rotary disk 229a of the ND filter 229 slightly so that the center of the selected one of the five circular translucent portions 161a through 161e slightly deviates from the central ray 230a of the measuring light 230. This operation makes it possible to deviate the central ray 230b of the measuring light 230 passed through the light-shield mask 161 from the collimation axis 10a to reduce the vignetting. In this case, the beam profile of the measuring light 230 which is passed through the selected one of the five circular translucent portions 161a through 161e deviates in a direction to adjust the position of the barycenter of the area of the light transmitting mirror 21a.

FIG. 15 is a flow chart showing an operating procedure of the third embodiment of the electronic distance meter shown in FIG. 13. Operations at steps S201 through S223 are identical to operations at steps S101 through S123 in FIG. 12, respectively. Accordingly, only the operations at and after step S225 will be hereinafter discussed.

If the distance measuring operation start switch is ON (if YES at step S123), the control circuit 40 activates the light emitting element 23 to emit the measuring light 230 to perform the distance measuring operation (step S225). Subsequently, it is determined whether the light receiving element 31 is receiving the reflected light from the sighting object 16 (step S227).

If it is determined that the light receiving element 31 is not receiving enough reflected measuring light from the sighting object 16 (if NO at step S227), the control circuit 40 actuates the second actuator 36 to rotate the rotary disk 229a of the ND filter 229 slightly to adjust the position of the selected one of the five circular translucent portions 161a through 161e with respect to the central ray 230a of the measuring light 230 to reduce vignetting caused by the light transmitting mirror 21a (step S229). On the other hand, if it is determined at step S227 that the light receiving element 31 is receiving the reflected measuring light from the sighting object 16, control skips the operation at step S229. In this case, the center of the selected one of the five circular translucent portions 161a through 161e does not have to deviate from the central ray 230a of the measuring light 230 since it has been determined that vignetting is caused by the light transmitting mirror 21a is negligible. Subsequently, the control circuit 40 (the optical distance meter 20) calculates the distance from the electronic distance meter to the sighting object 16 in accordance with the amount of light received by the light receiving element 31, i.e., in accordance with the output received from the receiving element 31 (step S231). Subsequently, the control circuit 40 brings the calculated distance into view on the indicating device 42 (step S235).

According to the third embodiment of the electronic distance meter shown in FIG. 13, similar to the second embodiment of the electronic distance meter shown in FIG. 10, vignetting caused by the light transmitting mirror 21a can be substantially decreased in the distance measuring mode by an optical arrangement wherein the central ray 230b of the measuring light 230 passed through the light-shield mask 161 deviates from the collimation axis 10a. Moreover, the measuring light 230 can be used as a pointer for collimation in the pointer mode by an optical arrangement wherein the central ray 230c of the measuring light 230 passed through the diffraction mask 62 is coincident with the collimation axis 10a of the sighting telescope 10 from the light transmitting mirror 21a to the sighting object 16.

FIG. 16A is a plan view of the ND filter 329 used in a fourth embodiment of the electronic distance meter equipped with an autofocus system, according to the present invention. The fourth embodiment is substantially the same as the second embodiment of the electronic distance meter shown in FIG. 10 except that the light-shield mask 161 formed on the rotary disk 129a shown in FIG. 11A in the second embodiment is replaced by a light-shield mask 361 formed on a rotary disk 329a of a ND filter 329 (which corresponds to the rotary disk 129a of the ND filter 129 shown in FIG. 1A). In other words, the rotary disk 329a is provided with the light-shield mask 361 and the diffraction mask 62 at different radius positions from the rotational axis 29d.

The light-shield mask 361 is provided with an arc-shaped translucent portion 361a which intercepts opposite ends of the elliptical beam profile of the measuring light 330 in a direction of the major axis of the elliptical beam profile. The light-shield mask 361 is provided over the arc-shaped translucent portion 361a with a ND filter having an uneven density. The light transmittance of the ND filter (the light-shield mask 361) gradually decreases in opposite radial directions of the rotary disk 329a from an approximate center (from the circle h) of the arc-shaped translucent portion 361a as shown in FIG. 16B. Moreover, the light transmittance of the ND filter (the light-shield mask 361) varies in a circumferential direction of the rotary disk 329a.

The circle g which is coincident with loci of the each center of the six diffraction aperture 62a through 62f upon rotating of the rotary disk 329a intersects the central ray of the measuring light 330 emitted from the light emitting element 23, while the circle h which is coincident with a locus of the center of the arc-shaped translucent portion 361a upon rotating of the rotary disk 329a is deviated from the central ray of the measuring light 330 emitted from the light emitting element 23.

In the embodiment shown in FIG. 16A, a laser diode which emits a laser beam having an elliptical beam profile is used to serve as the light emitting element 23. Opposite ends of the elliptical beam profile of the laser beam (the measuring light 330) in a direction of the major axis of the elliptical beam profile ion cause to vignetting to occur via the light transmitting mirror 21a. To prevent this problem from occurring, in the fourth embodiment of the electronic distance meter, opposite ends of the elliptical beam profile of the measuring light 330 in a direction of the major axis of the elliptical beam profile are cut off by positioning the arc-shaped translucent portion 361a in the distance-measuring optical path between the light emitting element 23 and the fixed mirror 25 in the distance measuring mode. This reduces the vignetting caused by the light transmitting mirror 21a, and makes it difficult for the measuring light 330 to generate diffraction fringes, thus achieving the distance measuring operation of the optical distance meter 20 with a high degree of precision. Similar to the first embodiment of the electronic distance meter, in the fourth embodiment of the electronic distance meter, the amount of the measuring light 330 passing through the light-shield mask 361 can be adjusted by changing the rotational position (angular position) of the arc-shaped translucent portion 361a with respect to the central ray 330a of the measuring light 330.

In each of the above described first through fourth embodiments of the electronic distance meters, since a light-shield mask for defining the beam profile of the measuring light projected toward a target is provided in a translucent portion of the light-shield mask with a ND filter (an uneven density filter), the light transmittance of which gradually decreases from an approximate center of the translucent portion toward edges thereof, it is difficult for the measuring light to be diffracted by an edge of the translucent portion, thereby substantially no diffraction fringes are produced at a measuring point. This makes it possible to measure distances with a high degree of precision without being influenced by terms and conditions of the measuring point. In addition, since the electronic distance meter is provided with a diffraction mask having at least one diffraction aperture for making the measuring light generate diffraction fringes, and since the at least one diffraction aperture is positioned in a distance-measuring optical path in the pointer mode, diffraction fringes which spread in radial directions are produced at a measuring point. Such diffraction fringes make it easy for the surveyor to visually perceive the center of the measuring light spot on the target, regardless of the beam profile of the measuring light projected toward the target when the measuring light is used as a pointer for collimation.

Although the diffraction mask is formed on a rotary disk of a ND filter in each of the above described first through fourth embodiments of the electronic distance meters, the diffraction mask can be provided separately from the ND filter. The shape of each diffraction aperture is not limited solely to a triangle, a rectangle or a circle, but also can be any other shape such as an ellipse. The number of diffraction apertures formed on the diffraction mask can be any number; the diffraction mask can have only one diffraction aperture.

In each of the above described first through fourth embodiments of the electronic distance meters, since the diffraction fringes such as shown in FIG. 5 are produced at a measuring point while the light emitting element 23 is emitting the measuring light 30 if a rectangular diffraction aperture (e.g., the large rectangular aperture 62e or the small rectangular aperture 62f in each of the above described first through fourth embodiments) of the diffraction mask 62 of the ND filter 29, 129, 229 or 329 is inserted into the distance-measuring optical path between the light emitting element 23 and the fixed mirror 25, a horizontal line can be indicated at the measuring point in a manner similar to that of a laser planar.

Although the translucent portion (61a or 361a) or each translucent portion (161a through 161e) of the light-shield mask (61, 161 or 361) is formed by a ND filter in each of the above described first through fourth embodiments of the electronic distance meter, the present invention is not limited solely to these particular embodiments. For instance, the ND filter can be replaced by a mirror or a transparent plate on which different coatings of paint having different light absorptances are painted in stages, or on which different coatings having different light absorptances are coated in stages. Depending on the distance to the sighting object, there is sometimes the case that the spaces between the diffraction fringes formed at a point of measurement become small due to the size of the translucent portion of the light-shield mask to thereby make it difficult for the surveyor to perceive the diffraction fringes. In this case, the shape of the translucent portion of the light-shield mask can be changed to a round shape.

Although electronic distance meter of the present invention is provided with both a light-shield mask for defining a beam profile of the measuring light and a diffraction mask for causing the measuring light to produce diffraction fringes, each of the above described first through fourth embodiments of the electronic distance meters can be provided with only the light-shield mask or only the diffraction mask.

Although a phase-difference detection AF sensor unit is used as the AF sensor unit 50 in each of the above described first through fourth embodiments of the electronic distance meters, any other type of AF sensor unit can be used as the AF sensor unit 50. For instance, a contrast detection AF sensor unit can be used as the AF sensor unit 50.

Although the present invention has been applied to each of the above described embodiments of the electronic distance meters (surveying instruments) having an optical distance meter, the present invention can also be applied to any other surveying instrument, for example, a level.

As can be understood from the above description, an electronic distance meter is achieved which makes it possible to measure distances with a high degree of precision without being influenced by terms and conditions of the measuring point. Moreover, an electronic distance meter is achieved in which it is easy to visually perceive the center of the measuring light spot on the target when the measuring light is used as a pointer for collimation.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An electronic distance meter comprising:
   a sighting telescope optical system having an objective lens for sighting an object; and
   an optical distance meter which includes a light-transmitting optical system for transmitting a measuring light toward said object via said objective lens, and a light-receiving optical system for receiving a portion of said measuring light which is reflected by said object;
   wherein said light-transmitting optical system includes a light-shield mask having a translucent portion to define a beam profile of said measuring light, and
   wherein said translucent portion comprises a filter having an uneven density, light transmittance of a central portion of said filter being greater than light transmittance of a peripheral portion of said filter.

2. The electronic distance meter according to claim 1, wherein said filter comprises a neutral density filter.

3. The electronic distance meter according to claim 1, wherein said light transmittance of said filter has a Gaussian distribution.

4. The electronic distance meter according to claim 1, wherein said translucent portion is in the shape of one of a rectangle, a triangle, a circle and an ellipse.

5. The electronic distance meter according to claim 1, further comprising:
   a diffraction mask having at least one diffraction aperture which causes diffraction fringes on the measuring light passed therethrough; and
   a mode selecting device for switching between a pointer mode in which said diffraction mask is inserted into a distance-measuring optical path and a distance measuring mode in which said diffraction mask is retracted from said distance-measuring optical path.

6. The electronic distance meter according to claim 5, wherein said diffraction aperture is in the shape of one of a rectangle, a triangle, a circle and an ellipse.

7. The electronic distance meter according to claim 5, wherein said light-transmitting optical system comprises a second neutral density filter for adjusting the amount of said measuring light.

8. The electronic distance meter according to claim 7, wherein said second neutral density filter comprises a rotary disk having a rotational axis extending parallel to said distance-measuring optical path,
wherein said rotary disk is provided with said diffraction aperture and an arc-shaped ND filter portion, both positioned on and along a circle having a predetermined radius about said rotational axis, light transmittance of said arc-shaped ND filter portion continuously varies in a circumferential direction thereof, and
wherein a central ray of said measuring light intersects said circle and incidents upon the center of said diffraction aperture or the centerline of said arc-shaped ND filter portion in accordance with rotational position of said rotary disk.

9. The electronic distance meter according to claim 8, further comprising a mask driver which rotates said rotary disk to insert said arc-shaped ND filter portion into said distance-measuring optical path when said distance measuring mode is selected by said mode selecting device, and to insert said diffraction aperture into said distance-measuring optical path when said pointer mode is selected by said mode selecting device.

10. The electronic distance meter according to claim 9, wherein said diffraction aperture comprises a plurality of diffraction apertures having different shapes, and wherein said mask driver selects a diffraction aperture from among said plurality of diffraction apertures and inserts the selected diffraction aperture into said distance-measuring optical path when said pointer mode is selected by said mode selecting device.

11. The electronic distance meter according to claim 10, further comprising a controller which actuates said mask driver in accordance with an object distance.

12. The electronic distance meter according to claim 11, further comprising a focus detecting device for detecting a focus state of said sighting telescope optical system, wherein said controller actuates said mask driver in accordance with said focus state detected by said focus detecting device.

13. The electronic distance meter according to claim 1, wherein said translucent portion is in the shape of one of a cross and a star.

14. The electronic distance meter according to claim 1, wherein said light transmittance of said filter decreases in radial directions from an approximate center of said filter toward opposite edges thereof.

15. The electronic distance meter according to claim 1, wherein said optical distance meter comprises a light source which emits said measuring light to travel in a distance-measuring optical path therealong.

16. The electronic distance meter according to claim 8, wherein said rotary disk comprises a plurality of slits at equi-angular intervals about said rotational axis, said plurality of slits being used to sense a rotational position of said rotary disk.

17. An electronic distance meter comprising:
a sighting telescope optical system having an objective lens for sighting an object;
an optical distance meter including a light-transmitting optical system for transmitting a measuring light toward said object on an optical axis of said objective lens therealong; and
a diffraction mask having at least one diffraction aperture which causes diffraction fringes on the measuring light passed therethrough.

18. The electronic distance meter according to claim 17, wherein said diffraction aperture is in the shape of one of a rectangle, a triangle, a circle and an ellipse.

19. The electronic distance meter according to claim 17, wherein said diffraction aperture comprises a plurality of diffraction apertures having different shapes, said electronic distance meter further comprising a mask driver which selects a diffraction aperture from among said plurality of diffraction apertures and inserts the selected diffraction aperture into a distance-measuring optical path.

20. The electronic distance meter according to claim 19, further comprising a controller which actuates said mask driver in accordance with an object distance.

21. The electronic distance meter according to claim 20, further comprising a focus detecting device for detecting a focus state of said sighting telescope optical system, wherein said controller actuates said mask driver in accordance with said focus state detected by said focus detecting device.

22. The electronic distance meter according to claim 17, wherein said optical distance meter comprises a light source which emits said measuring light to travel in a distance-measuring optical path therealong.

23. An electronic distance meter comprising:
a sighting telescope optical system having an objective lens for sighting an object;
an optical distance meter which includes a light-transmitting optical system for transmitting a measuring light toward said object via said objective lens, and a light-receiving optical system for receiving a portion of said measuring light which is reflected by said object;
a mode selecting device for switching between a distance measuring mode and a pointer mode; and
a rotary disk positioned in said light-transmitting optical system, said rotary disk having a rotational axis extending parallel to an distance-measuring optical path;
wherein said rotary disk is provided with a diffraction mask and a light-shield mask at different radius positions from the rotational axis of the rotary disk, said diffraction mask having at least one diffraction aperture for causing diffraction fringes on the measuring light passed therethrough, said light-shield mask including at least one translucent portion for defining a beam profile of said measuring light,
wherein said translucent portion comprises a filter having an uneven density, light transmittance of a central portion of the filter being greater than light transmittance of a peripheral portion of the filter,
wherein said rotary disk is rotated to insert said diffraction aperture into said distance-measuring optical path when said pointer mode is selected by said mode selecting device, and to insert said translucent portion into said distance-measuring optical path when said distance measuring mode is selected by said mode selecting device, and
wherein a locus of the center of said diffraction aperture upon rotating said rotary disk intersects said distance-measuring optical path while a locus of the center of said translucent portion upon rotating said rotary disk is deviated from said distance-measuring optical path.

24. The electronic distance meter according to claim 23, wherein said filter comprises a neutral density filter.

25. The electronic distance meter according to claim 23, wherein said light transmittance of said filter has a Gaussian distribution.

26. The electronic distance meter according to claim 23, wherein said translucent portion is in the shape of one of a rectangle, a triangle, a circle and an ellipse.

27. The electronic distance meter according to claim 23, wherein said diffraction aperture is in the shape of one of a rectangle, a triangle, a circle and an ellipse.

28. The electronic distance meter according to claim 23, wherein said translucent portion comprises a plurality of translucent portions having the same shape and different light transmittances, said electronic distance meter further comprising a mask driver which selects a translucent portion from among said plurality of translucent portions and inserts the selected translucent portion into said distance-measuring optical path when said distance measuring mode is selected by said mode selecting device.

29. The electronic distance meter according to claim 28, further comprising a controller which actuates said mask driver in accordance with an object distance.

30. The electronic distance meter according to claim 29, further comprising a focus detecting device for detecting a focus state of said sighting telescope optical system, wherein said controller actuates said mask driver in accordance with said focus state detected by said focus detecting device.

31. The electronic distance meter according to claim 23, wherein said diffraction aperture comprises a plurality of diffraction apertures having different shapes, said electronic distance meter further comprising a mask driver which selects a diffraction aperture from among said plurality of diffraction apertures and inserts the selected diffraction aperture into said distance-measuring optical path when said pointer mode is selected by said mode selecting device.

32. The electronic distance meter according to claim 31, further comprising a controller which actuates said mask driver in accordance with an object distance.

33. The electronic distance meter according to claim 32, further comprising a focus detecting device for detecting a focus state of said sighting telescope optical system, wherein said controller actuates said mask driver in accordance with said focus state detected by said focus detecting device.

34. The electronic distance meter according to claim 23, wherein said light transmittance of said filter decreases in radial directions from a center of said filter toward opposite edges thereof.

35. The electronic distance meter according to claim 23, wherein said optical distance meter comprises a light source which emits said measuring light to travel in said distance-measuring optical path therealong.

36. The electronic distance meter according to claim 23, wherein said rotary disk comprises a plurality of slits at equi-angular intervals about said rotational axis, said plurality of slits being used to sense a rotational position of said second neutral density filter.

37. An electronic distance meter comprising:
a sighting telescope optical system having an objective lens for sighting an object;
an optical distance meter which includes a light-transmitting optical system for transmitting a measuring light toward said object via said objective lens, and a light-receiving optical system for receiving a portion of said measuring light which is reflected by said object;
a mode selecting device for switching between a distance measuring mode and a pointer mode; and
a rotary disk positioned in said light-transmitting optical system and having a rotational axis extending parallel to an distance-measuring optical path;
wherein said rotary disk is provided with a diffraction mask and a light-shield mask at same radius positions from the rotational axis of the rotary disk, said diffraction mask having at least one diffraction aperture for causing diffraction fringes on the measuring light passed therethrough, said light-shield mask having at least one translucent portion for defining a beam profile of said measuring light,
wherein a central ray of said measuring light incidents upon the center of said diffraction aperture or the center of said translucent portion in accordance with rotational position of said rotary disk,
wherein said translucent portion comprises a filter having an uneven density, light transmittance of a central portion of said filter being greater than light transmittance of a peripheral portion of said filter, and
wherein said electronic distance meter further comprises:
a mask driver which rotates said rotary disk to insert said translucent portion into said distance-measuring optical path when said distance measuring mode is selected by said mode selecting device, and to insert said diffraction aperture into said distance-measuring optical path when said pointer mode is selected by said mode selecting device; and
a controller which actuates said mask driver to rotate said rotary disk so that the center of said translucent portion deviates from said central ray of said measuring light if a measuring light which is reflected by said object is not received enough by said light-receiving optical system when in said distance measuring mode.

38. The electronic distance meter according to claim 37, wherein said filter comprises a neutral density filter.

39. The electronic distance meter according to claim 37, wherein said light transmittance of said filter has a Gaussian distribution.

40. The electronic distance meter according to claim 37, wherein said translucent portion is in the shape of one of a rectangle, a triangle, a circle and an ellipse.

41. The electronic distance meter according to claim 37, wherein said diffraction aperture is in the shape of one of a rectangle, a triangle, a circle and an ellipse.

42. The electronic distance meter according to claim 37, wherein said translucent portion comprises a plurality of translucent portions having the same shape and different light transmittances, and wherein said mask driver selects a translucent portion from among said plurality of translucent portions and inserts the selected translucent portion into said distance-measuring optical path when said distance measuring mode is selected by said mode selecting device.

43. The electronic distance meter according to claim 42, wherein said controller actuates said mask driver in accordance with an object distance.

44. The electronic distance meter according to claim 43, further comprising a focus detecting device for detecting a focus state of said sighting telescope optical system, wherein said controller actuates said mask driver in accordance with said focus state detected by said focus detecting device.

45. The electronic distance meter according to claim 37, wherein said diffraction aperture comprises a plurality of diffraction apertures having different shapes, and wherein said mask driver selects a diffraction aperture from among said plurality of diffraction apertures and inserts the selected diffraction aperture into said distance-measuring optical path when said pointer mode is selected by said mode selecting device.

46. The electronic distance meter according to claim 45, wherein said controller actuates said mask driver in accordance with an object distance.

47. The electronic distance meter according to claim 46, further comprising a focus detecting device for detecting a focus state of said sighting telescope optical system, wherein said controller actuates said mask driver in accordance with said focus state detected by said focus detecting device.

48. The electronic distance meter according to claim 37, wherein said light transmittance of said filter decreases in radial directions from a center of said filter toward opposite edges thereof.

49. The electronic distance meter according to claim 37, wherein said optical distance meter comprises a light source which emits said measuring light to travel in said distance-measuring optical path therealong.

50. The electronic distance meter according to claim 37, wherein said rotary disk comprises a plurality of slits at equi-angular intervals about said rotational axis, said plurality of slits being used to sense a rotational position of said rotary disk.

51. An electronic distance meter comprising:

a sighting telescope optical system having an objective lens for sighting an object;

an optical distance meter which includes a light-transmitting optical system for transmitting a measuring light toward said object via said objective lens, and a light-receiving optical system for receiving a portion of said measuring light which is reflected by said object, said measuring light having an elliptical beam profile;

a mode selecting device for switching between a distance measuring mode and a pointer mode; and a rotary disk positioned in said light-transmitting optical system and having a rotational axis extending parallel to an distance-measuring optical path;

wherein said rotary disk is provided with a diffraction mask and a light-shield mask at different radius positions from the rotational axis of the rotary disk, said diffraction mask having at least one diffraction aperture for causing diffraction fringes on the measuring light passed therethrough, said light-shield mask having an arc-shaped translucent portion which intercepts opposite ends of said elliptical beam profile of the measuring light in a direction of a major axis of said elliptical beam profile, wherein said arc-shaped translucent portion comprises a filter having an uneven density, light transmittance of said filter decreases in radical directions from an approximate center of said filter toward opposite edges thereof, light transmittance of said filter also varying in a circumferential direction of said rotary disk, wherein said rotary disk is rotated to insert said diffraction aperture into said distance-measuring optical path when said pointer mode is selected by said mode selecting device, and to insert said arc-shaped translucent portion into said distance-measuring optical path when said distance measuring mode is selected by said mode selecting device, and wherein a locus of the center of the diffraction aperture upon rotating the rotary disk intersects said distance-measuring optical path, while a locus of the center of the translucent portion upon rotating the rotary disk is deviated from the distance-measuring optical path.

52. The electronic distance meter according to claim 51, wherein said filter comprises a neutral density filter.

53. The electronic distance meter according to claim 51, wherein said diffraction aperture is in the shape of one of a rectangle, a triangle, a circle and an ellipse.

54. The electronic distance meter according to claim 51, wherein said optical distance meter comprises a light source which emits said measuring light to travel in said distance-measuring optical path therealong.

55. The electronic distance meter according to claim 51, wherein said rotary disk comprises a plurality of slits at equi-angular intervals about said rotational axis, said plurality of slits being used to sense a rotational position of said rotary disk.

* * * * *